(12) United States Patent
Kang et al.

(10) Patent No.: US 12,464,716 B2
(45) Date of Patent: Nov. 4, 2025

(54) NAND CELL STRUCTURE WITH CHARGE TRAP CUT

(71) Applicant: Applied Materials, Inc., Santa Clara, CA (US)

(72) Inventors: Chang Seok Kang, Santa Clara, CA (US); Tomohiko Kitajima, San Jose, CA (US); Gill Yong Lee, San Jose, CA (US); Balasubramanian Pranatharthiharan, San Jose, CA (US); Mukund Srinivasan, Fremont, CA (US)

(73) Assignee: Applied Materials, Inc., Santa Clara, CA (US)

( * ) Notice: Subject to any disclaimer, the term of this patent is extended or adjusted under 35 U.S.C. 154(b) by 438 days.

(21) Appl. No.: 18/055,058

(22) Filed: Nov. 14, 2022

(65) Prior Publication Data

US 2023/0164993 A1 May 25, 2023

Related U.S. Application Data

(60) Provisional application No. 63/281,781, filed on Nov. 22, 2021.

(51) Int. Cl.
*H10B 43/20* (2023.01)
*G11C 5/06* (2006.01)
*H10B 43/35* (2023.01)

(52) U.S. Cl.
CPC ............ *H10B 43/20* (2023.02); *G11C 5/063* (2013.01); *H10B 43/35* (2023.02)

(58) Field of Classification Search
CPC ......... H10B 43/20; H10B 43/35; G11C 5/063
See application file for complete search history.

(56) References Cited

U.S. PATENT DOCUMENTS

| | | | |
|---|---|---|---|
| 7,554,846 | B2 | 6/2009 | Helm |
| 8,300,466 | B2 | 10/2012 | Maejima |
| 9,960,045 | B1 | 5/2018 | Purayath |
| 10,319,739 | B2 | 6/2019 | Purayath |

(Continued)

FOREIGN PATENT DOCUMENTS

| | | |
|---|---|---|
| JP | 2019165133 A | 9/2019 |
| WO | 2014165461 A4 | 10/2014 |
| WO | 2018195423 A1 | 10/2018 |

OTHER PUBLICATIONS

PCT International Search Report and Written Opinion in PCT/US2022/080095 dated Mar. 16, 2023, 11 pages.

*Primary Examiner* — Richard A Booth
(74) *Attorney, Agent, or Firm* — SERVILLA WHITNEY LLC

(57) ABSTRACT

Described is a memory device including a plurality of memory cells formed around a memory hole extending through a memory stack on a substrate. Each of the plurality of memory cells comprises a discrete blocking oxide layer, a charge trap layer, and a tunnel oxide layer. The blocking oxide layer is discrete between each of the plurality of memory cells. The tunnel oxide layer is continuous between each of the plurality of memory cells, and the charge trap layer is discrete between each of the plurality of memory cells. The charge trap layer has a first thickness on a top portion and a second thickness on a center portion, the first thickness different than the second thickness.

10 Claims, 24 Drawing Sheets

(56) References Cited

U.S. PATENT DOCUMENTS

| | | |
|---|---|---|
| 10,325,923 B2 | 6/2019 | Purayath |
| 10,354,916 B2 | 7/2019 | Chen et al. |
| 10,403,637 B2 | 9/2019 | Lue |
| 10,410,869 B2 | 9/2019 | Roy et al. |
| 10,468,259 B2 | 11/2019 | Purayath et al. |
| 10,529,737 B2 | 1/2020 | Purayath |
| 10,541,246 B2 | 1/2020 | Purayath |
| 10,553,604 B2 | 2/2020 | Lu et al. |
| 10,622,251 B2 | 4/2020 | Chen et al. |
| 10,790,298 B2 | 9/2020 | Purayath |
| 10,886,172 B2 | 1/2021 | Chen |
| 10,964,717 B2 | 3/2021 | Kang et al. |
| 10,998,329 B2 | 5/2021 | Koshizawa et al. |
| 11,024,371 B2 | 6/2021 | Cui et al. |
| 11,049,695 B2 | 6/2021 | Kang et al. |
| 2007/0042548 A1 | 2/2007 | Noh et al. |
| 2010/0155810 A1 | 6/2010 | Kim et al. |
| 2014/0175530 A1 | 6/2014 | Chien et al. |
| 2015/0123189 A1 | 5/2015 | Sun et al. |
| 2015/0140797 A1 | 5/2015 | Hopkins et al. |
| 2017/0069637 A1 | 3/2017 | Son et al. |
| 2017/0243879 A1 | 8/2017 | Yu et al. |
| 2017/0278864 A1 | 9/2017 | Hu et al. |
| 2018/0090307 A1 | 3/2018 | Brunner et al. |
| 2018/0144977 A1 | 5/2018 | Yu et al. |
| 2018/0254187 A1 | 9/2018 | Purayath et al. |
| 2018/0330985 A1 | 11/2018 | Yu et al. |
| 2019/0393042 A1 | 12/2019 | Roy et al. |
| 2020/0118822 A1 | 4/2020 | Falk et al. |
| 2020/0185408 A1 | 6/2020 | Song et al. |
| 2020/0203373 A1 | 6/2020 | Kang et al. |
| 2020/0266211 A1 | 8/2020 | Tao et al. |
| 2020/0312874 A1 | 10/2020 | Kang et al. |
| 2020/0350014 A1 | 11/2020 | Liu |
| 2020/0350287 A1 | 11/2020 | Liu |
| 2020/0402562 A1 | 12/2020 | Li et al. |
| 2020/0411509 A1 | 12/2020 | Yang et al. |
| 2021/0043643 A1 | 2/2021 | Lu et al. |
| 2021/0066343 A1 | 3/2021 | Choi et al. |
| 2021/0066346 A1* | 3/2021 | Lim ................. H10B 41/30 |
| 2021/0126005 A1 | 4/2021 | Lu et al. |
| 2021/0210142 A1 | 7/2021 | Liu |
| 2021/0217773 A1 | 7/2021 | Kang et al. |
| 2021/0225865 A1 | 7/2021 | Wu |
| 2021/0233779 A1 | 7/2021 | Kang et al. |
| 2021/0233918 A1 | 7/2021 | Koshizawa et al. |
| 2021/0249436 A1 | 8/2021 | Ding et al. |
| 2021/0257375 A1* | 8/2021 | Koshizawa ............ H10B 41/27 |
| 2021/0257385 A1 | 8/2021 | Hu et al. |
| 2021/0257386 A1 | 8/2021 | Wang et al. |
| 2021/0257387 A1 | 8/2021 | Huang et al. |
| 2021/0358943 A1* | 11/2021 | Lee ................. H10N 70/231 |

* cited by examiner

NAND CELL STRUCTURE WITH CHARGE TRAP CUT

CROSS-REFERENCE TO RELATED APPLICATIONS

This application claims priority to U.S. Provisional Application No. 63/281,781, filed Nov. 22, 2021, the entire disclosure of which is hereby incorporated by reference herein.

TECHNICAL FIELD

Embodiments of the present disclosure pertain to the field of electronic devices and methods and apparatus for manufacturing electronic devices. More particularly, embodiments of the disclosure provide 3D-NAND having a discontinuous charge trap layer and methods for forming.

BACKGROUND

Semiconductor technology has advanced at a rapid pace and device dimensions have shrunk with advancing technology to provide faster processing and storage per unit space. In NAND devices, the string current needs to be high enough to obtain sufficient current to differentiate ON and OFF cells. The string current is dependent on the carrier mobility which is enhanced by enlarging the grain size of the silicon channel.

Current 3D-NAND stacks based on charge trap as a storage layer include a continuous charge trap layer. The continuous charge trap layer causes two significant issues which hinder scale-down of word line (WL) to WL insulators-cell to cell interference and lateral charge spreading. To suppress these issues, the charge trap layer under the source and drain (S/D) of each cell needs to be eliminated with a trap-cut or confined structure. A trap-cut structure, however, is problematic because of partial use of the gate area and variation of shape and thickness in the trap layer due to deposition and removal processes.

Accordingly, there is a need in the art for 3D-NAND devices and methods of fabricating 3D-NAND devices having an improved charge trap layer.

SUMMARY

One or more embodiments of the disclosure are directed to a semiconductor memory device. The semiconductor memory device comprises: a plurality of memory cells formed around a memory hole extending through a memory stack on a substrate, the memory stack comprising alternating word lines and dielectric material, each of the plurality of memory cells comprising a discrete blocking oxide layer, a charge trap layer, and a tunnel oxide layer, wherein the blocking oxide layer is discrete between each of the plurality of memory cells, the tunnel oxide layer is continuous between each of the plurality of memory cells, and the charge trap layer is discrete between each of the plurality of memory cells; and a filled slit extending through the memory stack adjacent to the memory hole.

Further embodiments of the disclosure are directed to methods of forming a semiconductor memory device. In one or more embodiments, a method of forming a semiconductor device comprises: forming a memory hole in a memory stack comprising alternating layers of a first material and a second material on a substrate; recessing the second material through the memory hole to form a first recessed region; oxidizing a portion of the second material adjacent the memory hole to form a blocking oxide layer; depositing a charge trap layer on the blocking oxide layer; conformally depositing a sacrificial layer on the charge trap layer; selectively removing the charge trap layer from the sacrificial layer; removing the sacrificial layer; forming a bit line in the memory hole; patterning a slit; forming a plurality of word lines; and filling the slit.

Additional embodiments of the disclosure are directed to a non-transitory computer readable medium. In one or more embodiments, a non-transitory computer readable medium includes instructions, that, when executed by a controller of a processing chamber, causes the processing chamber to perform the operations of: form a memory hole in a memory stack comprising alternating layers of a first material and a second material on a substrate; recess the second material through the memory hole to form a first recessed region; oxidize a portion of the second material adjacent the memory hole to form a blocking oxide layer; deposit a charge trap layer on the blocking oxide layer; conformally deposit a sacrificial layer on the charge trap layer; selectively remove the charge trap layer from the sacrificial layer; remove the sacrificial layer; form a bit line in the memory hole; pattern a slit; form a plurality of word lines; and fill the slit.

BRIEF DESCRIPTION OF THE DRAWING

So that the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope.

DETAILED DESCRIPTION

Figure 1:
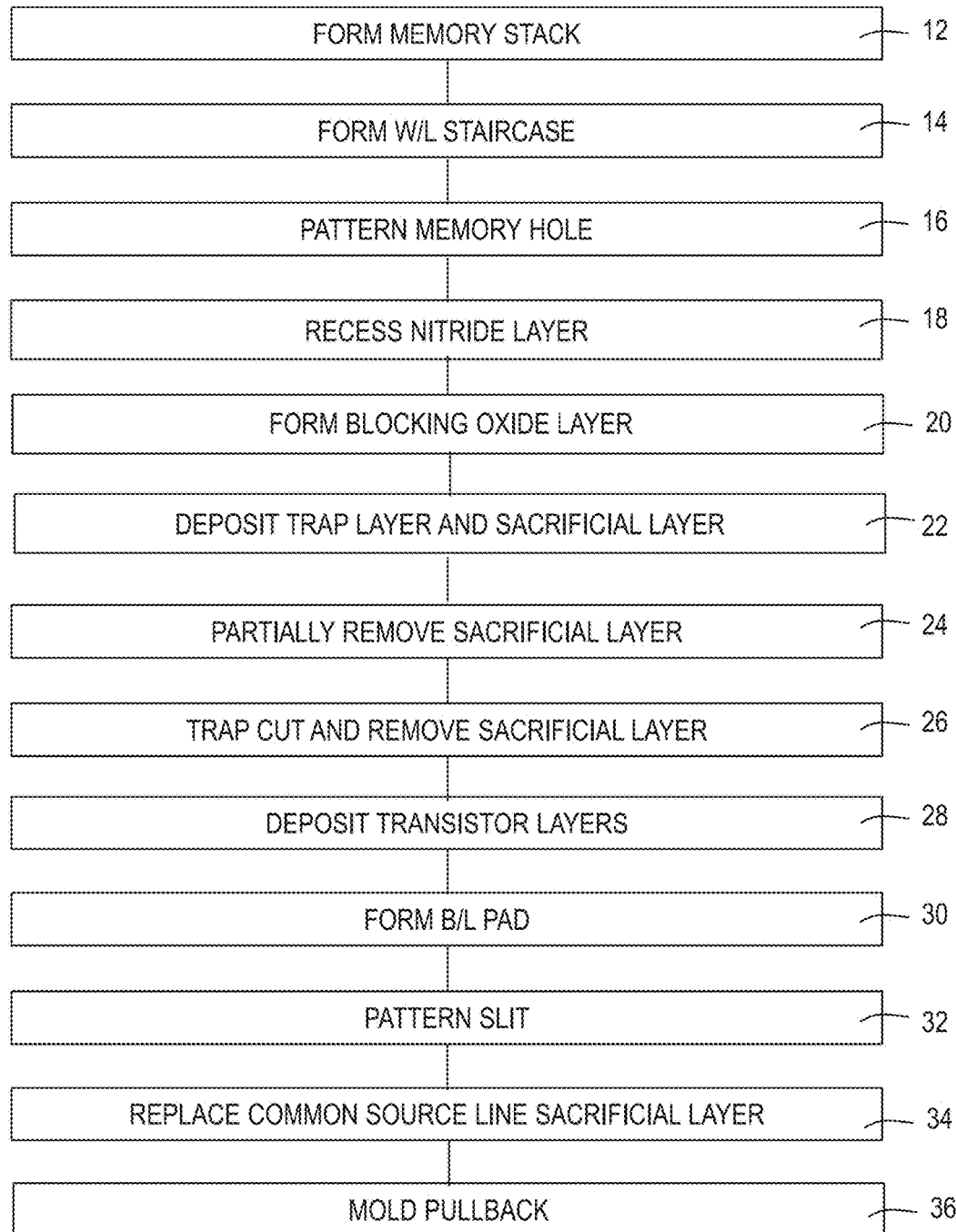
FIG. 1 illustrates a process flow diagram of a method of forming a memory device according to embodiments described herein.
Figure 1:
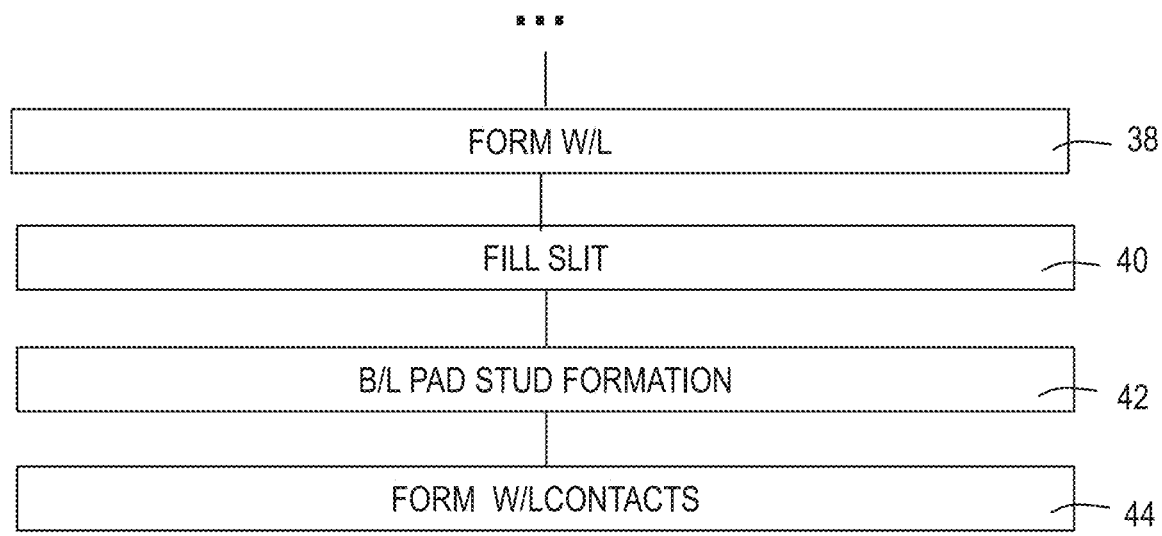

Before describing several exemplary embodiments of the disclosure, it is to be understood that the disclosure is not limited to the details of construction or process steps set forth in the following description. The disclosure is capable of other embodiments and of being practiced or being carried out in various ways.

As used in this specification and the appended claims, the terms "precursor," "reactant," "reactive gas" and the like are used interchangeably to refer to any gaseous species that can react with the substrate surface.

"Atomic layer deposition" or "cyclical deposition" as used herein refers to the sequential exposure of two or more reactive compounds to deposit a layer of material on a substrate surface. As used in this specification and the appended claims, the terms "reactive compound", "reactive gas", "reactive species", "precursor", "process gas" and the like are used interchangeably to mean a substance with a species capable of reacting with the substrate surface or material on the substrate surface in a surface reaction (e.g., chemisorption, oxidation, reduction). The substrate, or portion of the substrate, is exposed to the precursors (or reactive gases) sequentially or substantially sequentially. As used herein throughout the specification, "substantially sequentially" means that a majority of the duration of a precursor exposure does not overlap with the exposure to a co-reagent, although there may be some overlap.

The term "over" as used herein does not imply a physical orientation of one surface on top of another surface, rather a relationship of the thermodynamic or kinetic properties of the chemical reaction with one surface relative to the other surface. For example, selectively depositing a film onto a damaged dielectric material over an oxide material means that the film deposits on the damaged dielectric material and less or no film deposits on the oxide material; or that the formation of the film on the damaged dielectric material is thermodynamically or kinetically favorable relative to the formation of a film on the oxide material.

In the following description, numerous specific details, such as specific materials, chemistries, dimensions of the elements, etc. are set forth in order to provide thorough understanding of one or more of the embodiments of the present disclosure. It will be apparent, however, to one of ordinary skill in the art that the one or more embodiments of the present disclosure may be practiced without these specific details. In other instances, semiconductor fabrication processes, techniques, materials, equipment, etc., have not been descried in great details to avoid unnecessarily obscuring of this description. Those of ordinary skill in the art, with the included description, will be able to implement appropriate functionality without undue experimentation.

While certain exemplary embodiments of the disclosure are described and shown in the accompanying drawings, it is to be understood that such embodiments are merely illustrative and not restrictive of the current disclosure, and that this disclosure is not restricted to the specific constructions and arrangements shown and described because modifications may occur to those ordinarily skilled in the art.

In existing 3D NAND devices based on a memory stack of alternating layers of an oxide material and a nitride material and having a charge trap as a storage layer, the charge trap is a continuous layer. The continuous charge trap layer causes cell-to-cell interference and lateral charge spreading, which hinder a scale-down of word line (WL) to WL insulators. To address the cell-to-cell interference and the lateral charge spreading, the trap layer under the source and drain (S/D) of each cell needs to be eliminated using a trap-cut or confined structure. The trap-cut, however, cannot use the gate area, and the trap layer must have a consistent shape and thickness. Accordingly, one or more embodiments provide 3D NAND structures and method of fabricating a charge trap layer using a trap-cut.

One or more embodiments provide structures and methods for fabricating a 3-NAND device using atomic layer deposition silicon nitride for the formation of a discontinuous charge trap layer. The charge trap layer of one or more embodiments is confined only between the tunnel oxide and word line so that cell-to-cell interference and lateral spreading are not suppressed. In one or more embodiments, a non-selective silicon nitride (SiN) can be used as the charge trap layer.

In one or more embodiments, metal deposition and other processes can be carried out in an isolated environment (e.g., a cluster process tool). Accordingly, some embodiments of the disclosure provide integrated tool systems with related process modules to implement the methods.

FIG. 1 illustrates a flowchart for an exemplary method 10 for forming a memory device. The skilled artisan will recognize that the method 10 can include any or all of the processes illustrated. Additionally, the order of the individual processes can be varied for some portions. The method 10 can start at any of the enumerated processes without deviating from the disclosure. With reference to FIG. 1, at operation 12, a memory stack is formed. At operation 14, a word line staircase is formed in the memory stack. At operation 16, a memory hole is patterned. At operation 18, the nitride layer is recessed. At operation 20, a blocking oxide is formed in the recess. At operation 22, a charge trap layer is deposited, followed by deposition of a sacrificial layer. At operation 24, the sacrificial layer is partially removed. At operation 26, the charge trap layer is unmasked, and the sacrificial layer is removed. At operation 28, transistor layers are deposited in the memory hole. At operation 30, the bit line pad is formed. At operation 32, the device is slit patterned. At operation 34, the sacrificial layer of the common source line is removed and replaced. At operation 36, the nitride layer of the memory stack is removed (mold pullback). At operation, 38, the word line is formed. At operation 40, the slit is filled. At operation 42, the bit line pad studs are formed. At operation 44, back-end-of-the-line (BEOL) contacts are formed.

FIGS. 2-21 illustrate a portion of a memory device 100 following the process flow illustrated for the method 10 of FIG. 1.

Figure 2:
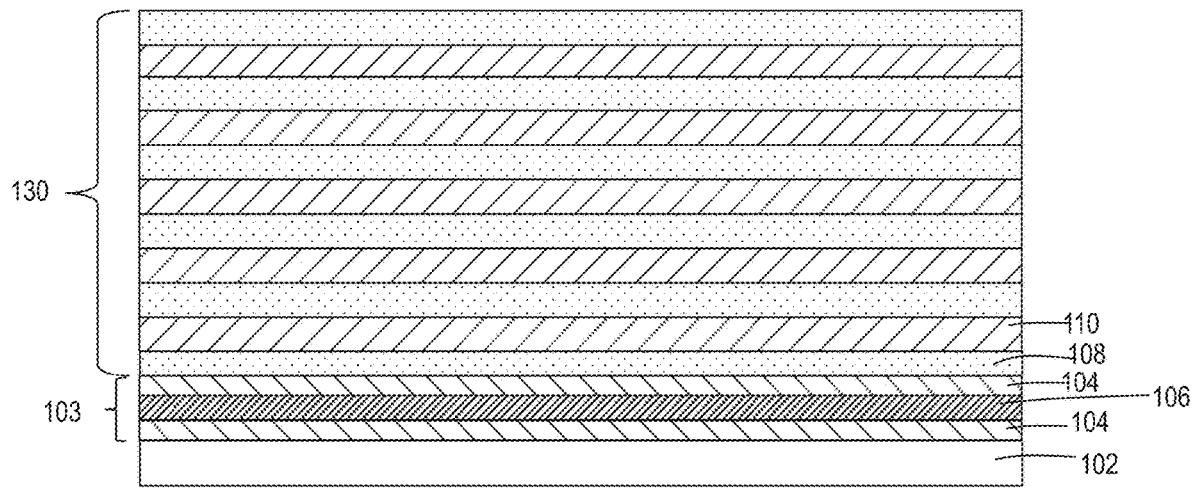
FIG. 2 illustrates a cross-sectional view of an electronic device with a memory stack according to one or more embodiments.

FIG. 2 illustrates an initial or starting memory stack of an electronic device 100 in accordance with one or more embodiments of the disclosure. In some embodiments, the electronic device 100 shown in FIG. 2 is formed on the bare substrate 102 in layers, as illustrated. The electronic device of FIG. 2 is made up of a substrate 102, a common source line 103, and a memory stack 130.

The substrate 102 can be any suitable material known to the skilled artisan. As used in this specification and the appended claims, the term "substrate" refers to a surface, or portion of a surface, upon which a process acts. It will also be understood by those skilled in the art that reference to a substrate can refer to only a portion of the substrate unless the context clearly indicates otherwise. Additionally, reference to depositing on a substrate can mean both a bare substrate and a substrate with one or more films or features deposited or formed thereon.

A "substrate" as used herein, refers to any substrate or material surface formed on a substrate upon which film processing is performed during a fabrication process. For example, a substrate surface on which processing can be performed include materials such as silicon, silicon oxide, strained silicon, silicon on insulator (SOI), carbon doped silicon oxides, amorphous silicon, doped silicon, germanium, gallium arsenide, glass, sapphire, and any other materials such as metals, metal nitrides, metal alloys, and other conductive materials, depending on the application. Substrates include, without limitation, semiconductor wafers. Substrates may be exposed to a pretreatment process to polish, etch, reduce, oxidize, hydroxylate, anneal and/or bake the substrate surface. In addition to film processing directly on the surface of the substrate itself, in the present disclosure, any of the film processing steps disclosed may also be performed on an under-layer formed on the substrate as disclosed in more detail below, and the term "substrate surface" is intended to include such under-layer as the context indicates. Thus, for example, where a film/layer or partial film/layer has been deposited onto a substrate surface, the exposed surface of the newly deposited film/layer becomes the substrate surface.

In one or more embodiments, a common source line 103 is on the substrate 102. The common source line 103 may also be referred to as the semiconductor layers. The common source line 103 can be formed by any suitable technique known to the skilled artisan and can be made from any suitable material including, but not limited to, poly-silicon (poly-Si). In some embodiments, the common source line 103 comprises several different conductive or a semiconductor material. For example, in one or more embodiments, as illustrated in FIG. 2, the common source line 103 comprises a poly-silicon layer 104 on the substrate 102, a common source sacrificial layer 106 on the polysilicon layer, and a second polysilicon layer 104 on the common source sacrificial layer 106.

In one or more embodiments, a sacrificial layer 106 may formed on the polysilicon layer 104 and can be made of any suitable material. The sacrificial layer 106 in some embodiments is removed and replaced in later processes. In some embodiments, the sacrificial layer 106 is not removed and remains within the memory device 100. In this case, the term "sacrificial" has an expanded meaning to include permanent layers and may be referred to as the conductive layer. In the illustrated embodiment, as described further below, the sacrificial layer 106 is removed in operation 34. In one or more embodiments, the sacrificial layer 106 comprises a material that can be removed selectively versus the neighboring polysilicon layer 104. In one or more embodiments, the sacrificial layer comprises a nitride material, e.g., silicon nitride (SiN), or an oxide material, e.g., silicon oxide ($SiO_x$).

In one or more embodiments, a memory stack 130 is formed on the common source line 103. The memory stack 130 in the illustrated embodiment comprises a plurality of alternating first layers 108 and second layers 110. While the memory stack 130, illustrated in FIG. 2, has five pairs of alternating first layers 108 and second layers 110, one of skill in the art recognizes that this is merely for illustrative purposes only. The memory stack 130 may have any number of alternating first layers 108 and second layers 110. For example, in some embodiments, the memory stack 130 comprises 192 pairs of alternating first layers 108 and second layers 110. In other embodiments, the memory stack 130 comprises greater than 50 pairs of alternating first layers 108 and second layers 110, or greater than 100 pairs of alternating first layers 108 and second layers 110, or greater than 300 pairs of alternating first layers 108 and second layers 110.

In one or more embodiments, the first layers 108 and the second layers 110 independently comprise a dielectric material. In one or more embodiments, the dielectric material may comprise any suitable dielectric material known to the skilled artisan. As used herein, the term "dielectric material" refers to an electrical insulator that can be polarized in an electric field. In some embodiments, the dielectric material comprises one or more of oxides, carbon doped oxides, porous silicon dioxide ($SiO_2$), silicon nitride (SiN), silicon dioxide/silicon nitride, carbides, oxycarbides, nitrides, oxynitrides, oxycarbonitrides, polymers, phosphosilicate glass, fluorosilicate (SiOF) glass, or organosilicate glass (SiOCH).

In one or more embodiments, the first layers 108 comprise oxide layers and the second layers 110 comprise nitride layers. In one or more embodiments, the second layers 110 comprise a material that is etch selective relative to the first layers 108 so that the second layers 110 can be removed without substantially affecting the first layers 108. In one or more embodiments, the first layers 108 comprise silicon oxide ($SiO_x$). In one or more embodiments, the second layers 110 comprise silicon nitride (SiN). In one or more embodiments first layers 108 and second layers 110 are deposited by chemical vapor deposition (CVD) or physical vapor deposition (PVD).

The individual alternating layers may be formed to any suitable thickness. In some embodiments, the thickness of each second layer 110 is approximately equal. In one or more embodiments, each second layer 110 has a second layer thickness. In some embodiments, the thickness of each first layer 108 is approximately equal. As used in this regard, thicknesses which are approximately equal are within +/−5% of each other. In some embodiments, a silicon layer (not shown) is formed between the second layers 110 and first layers 108. The thickness of the silicon layer may be relatively thin as compared to the thickness of a layer of second layers 110 or first layers 108. In one or more embodiments, the first layers 108 have a thickness in a range of from about 0.5 nm to about 30 nm, including about 1 nm, about 3 nm, about 5 nm, about 7 nm, about 10 nm, about 12 nm, about 15 nm, about 17 nm, about 20 nm, about 22 nm, about 25 nm, about 27 nm, and about 30 nm. In one or more embodiments the first layer 108 has a thickness in the range of from about 0.5 to about 40 nm. In one or more embodiments, the second layers 110 have a thickness in a range of from about 0.5 nm to about 30 nm, including about 1 nm, about 3 nm, about 5 nm, about 7 nm, about 10 nm, about 12 nm, about 15 nm, about 17 nm, about 20 nm, about 22 nm, about 25 nm, about 27 nm, and about 30 nm. In one or more embodiments, the second layer 110 has a thickness in the range of from about 0.5 to about 40 nm.

In one or more embodiments first layers 108 and second layers 110 are deposited by chemical vapor deposition (CVD) or physical vapor deposition (PVD). The individual alternating layers may be formed to any suitable thickness. In some embodiments, the thickness of each second layer 112 is approximately equal. In one or more embodiments, each second layer 112 has a first second layer thickness. In some embodiments, the thickness of each first layer 110 is approximately equal. As used in this regard, thicknesses which are approximately equal are within +/−5% of each other. In one or more embodiments, the first layers 108 have a thickness in a range of from about 0.5 nm to about 30 nm, including about 1 nm, about 3 nm, about 5 nm, about 7 nm, about 10 nm, about 12 nm, about 15 nm, about 17 nm, about 20 nm, about 22 nm, about 25 nm, about 27 nm, and about 30 nm. In one or more embodiments, the second layers 110 have a thickness in a range of from about 0.5 nm to about 30 nm, including about 1 nm, about 3 nm, about 5 nm, about 7 nm, about 10 nm, about 12 nm, about 15 nm, about 17 nm, about 20 nm, about 22 nm, about 25 nm, about 27 nm, and about 30 nm.

Figure 3:
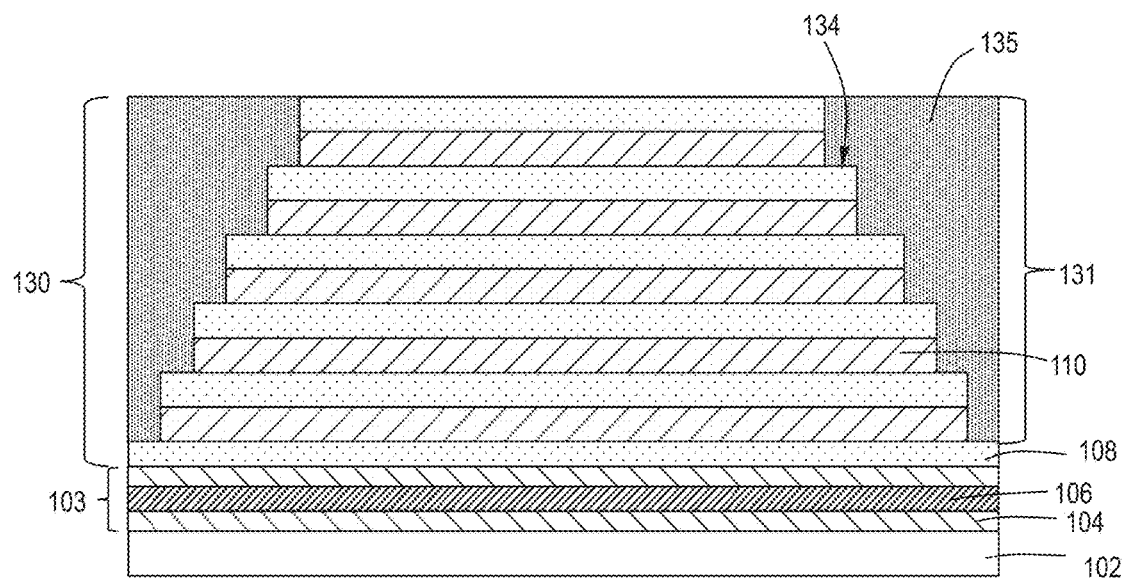
FIG. 3 illustrates a cross-sectional view of an electronic device after forming a staircase pattern of the memory stack according to one or more embodiments.

Referring to FIG. 3, at operation 14 of method 10, a staircase formation 131 is created. In one or more embodiments, the staircase formation 131 exposes a top surface 134 of the first layers 108. The top surface 134 can be used to provide space for word line contacts to be formed, as described below. A suitable fill material 135 can be deposited to occupy the space outside the staircase formation 131. A suitable fill material 135, as will be understood by the skilled artisan, can be any material that prevents electrical shorting between adjacent word lines. A staircase formation 131 with each word line having a smaller width (illustrated from left-to-right in the figures) than the word line below. Use of relative terms like "above" and "below" should not be taken as limiting the scope of the disclosure to a physical orientation in space.

Figure 4:
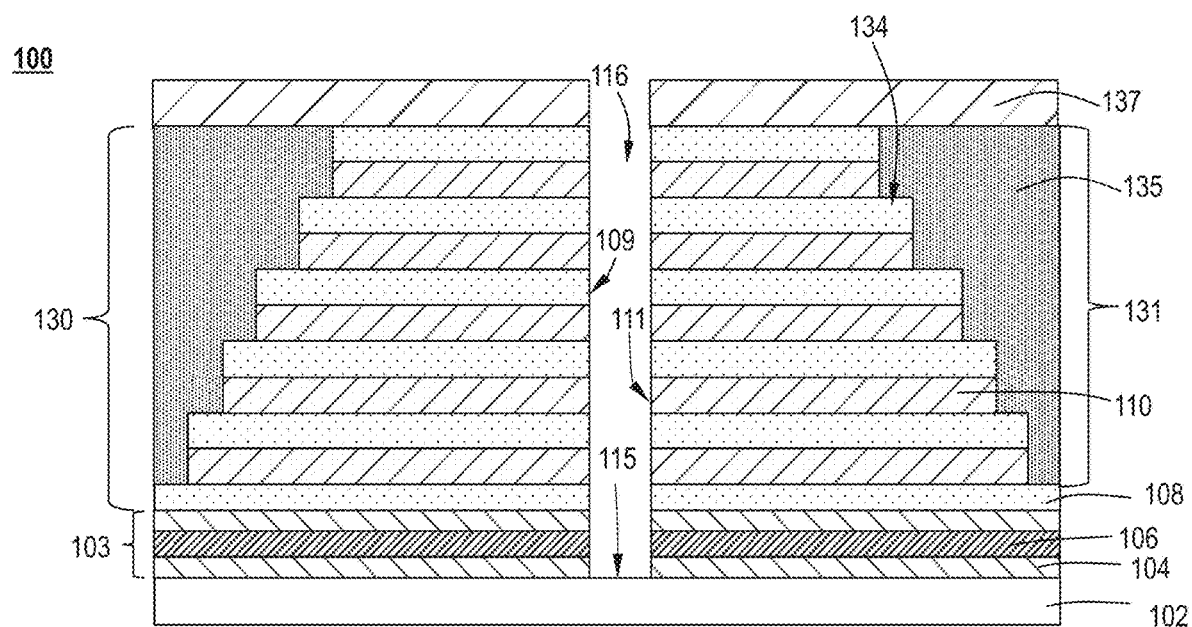
FIG. 4 illustrates a cross-sectional view of an electronic device according to one or more embodiments.

With reference to FIG. 4, at operation 16 a memory hole channel 116 is opened/patterned through the memory stack 130. In some embodiments, opening the memory hole channel 116 comprises etching through a mask layer 137, memory stack 130, common source line 103, and into substrate 102. The memory hole channel 116 has sidewalls that extend through the memory stack 130 exposing surfaces 111 of the second layers 110 and surfaces 109 of the first layers 108.

The memory hole channel 116 extends a distance into the substrate 102 so that sidewall surfaces 109, 111, 113 and bottom 115 of the memory hole channel 116 are formed within the substrate 102. The bottom 114 of the memory hole channel 116 can be formed at any point within the thickness of the substrate 102. In some embodiments, the memory hole channel 116 extends a thickness into the substrate 102 in the range of from about 1% to about 90%, or in the range of from about 5% to 90%, or in the range of from about 20% to about 80%, or in the range of from about 30% to about 70%, or in the range of from about 40% to about 60% of the thickness of the substrate 102. In some embodiments, the memory hole channel 116 extends a distance into the substrate 102 by greater than or equal to 10 nm.

Figure 5A:
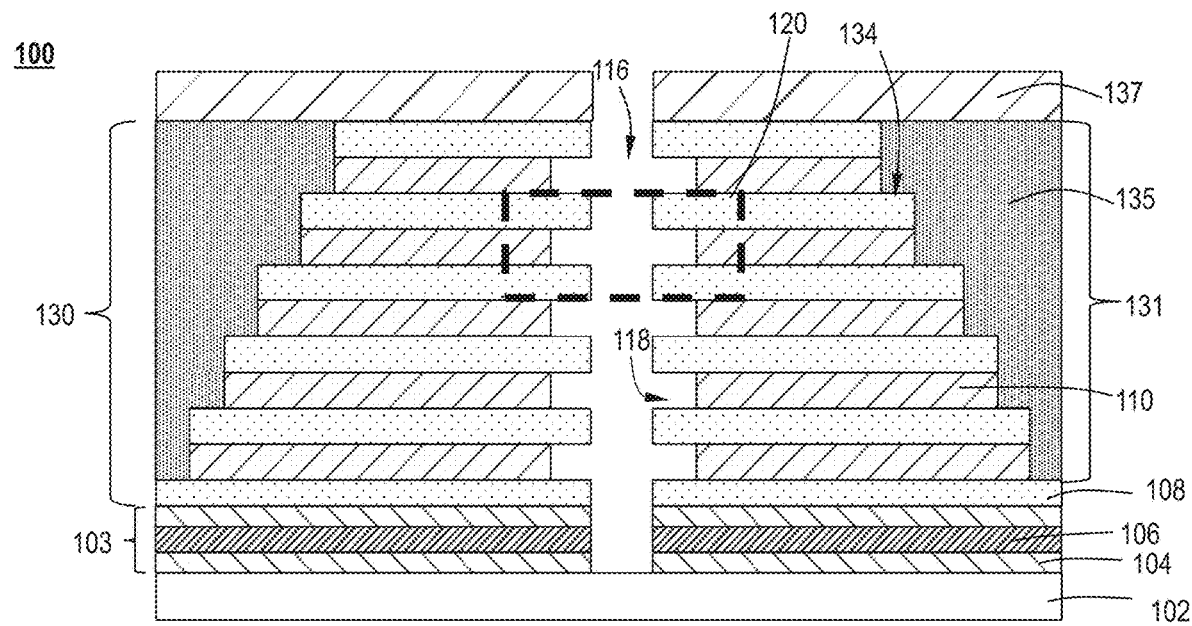
FIG. 5A illustrates a cross-sectional view of an electronic device according to one or more embodiments.
Figure 5B:
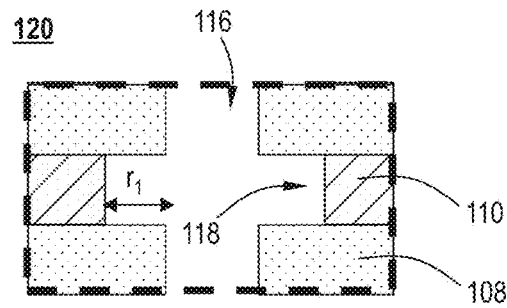
FIG. 5B illustrates an expanded view of region 120 according to one or more embodiments.

FIGS. 5A and 5B show operation 18 in which the second layers 110 are partially recessed through the memory hole 116 to form a recessed region 118. In one or more embodiments, the second layers 110 are recessed a recess distance, $r_1$, in a range of from 1 nm to 30 nm, or in a range of from 5 nm to 20 nm. Thus, in one or more embodiments, the recessed region 118 has a size in a range of from 1 nm to 30 nm, or in a range of from 5 nm to 20 nm. The second layers 110 may be recessed by any method known to the skilled artisan. In one or more embodiments, a portion of the second layers 110 is recessed through the memory hole 116 by selective removal with a reactive species formed via a remote plasma from a process gas comprising oxygen ($O_2$) and nitrogen trifluoride ($NF_3$). In other embodiments, a portion of the second layers 110 is recessed through the memory hole 116 by selective removal with hot phosphorus (HP).

Figure 6A:
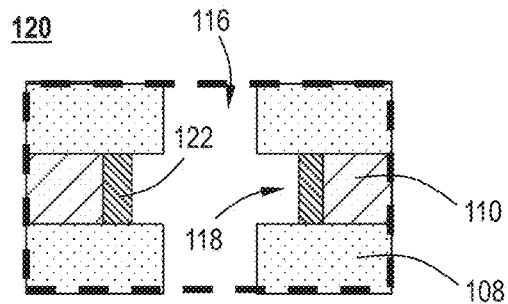
FIG. 6A illustrates an expanded view of region 120 according to one or more embodiments.
Figure 6B:
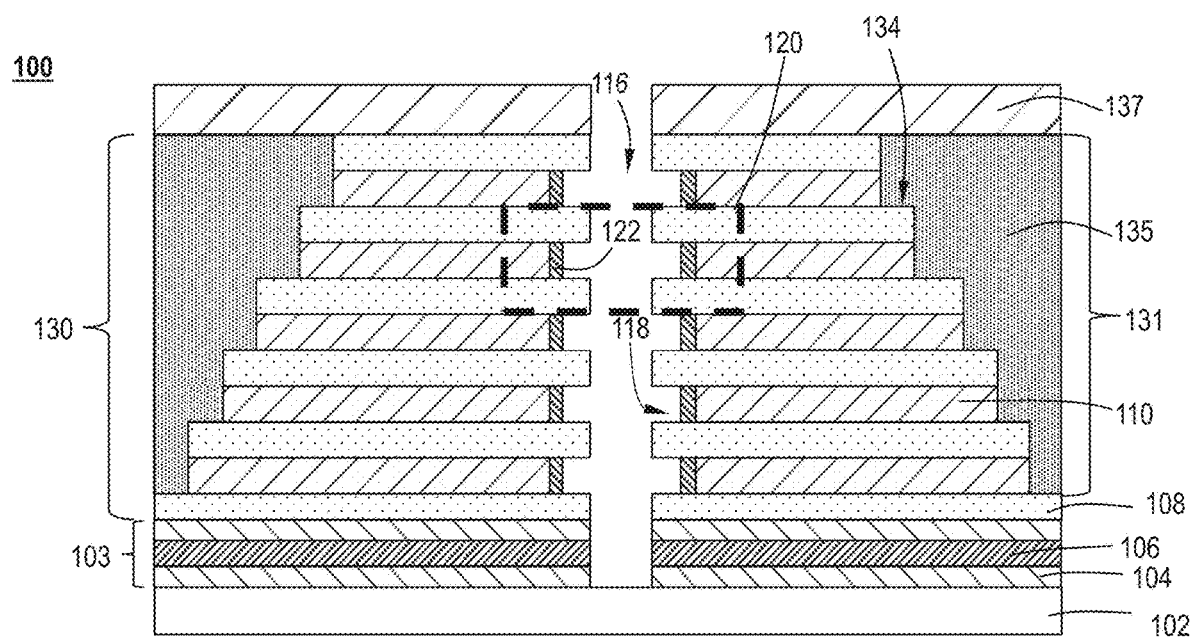
FIG. 6B illustrates a cross-sectional view of an electronic device according to one or more embodiments.

FIGS. 6A and 6B show operation 20 in which a blocking oxide layer 122 is formed in the recessed region 118 adjacent to the second layers 110. In one or more embodiments, the blocking oxide layer 122 is formed by oxidizing a portion of the second layers 110. Accordingly, in one or more embodiments, the blocking oxide layer comprises silicon oxynitride (SiON). The blocking oxide layer 122 may have any suitable thickness. In some embodiments, the blocking oxide layer 22 has a thickness in a range of from 1 nm to 15 nm or in a range of from 3 nm to 10 nm.

Figure 7A:
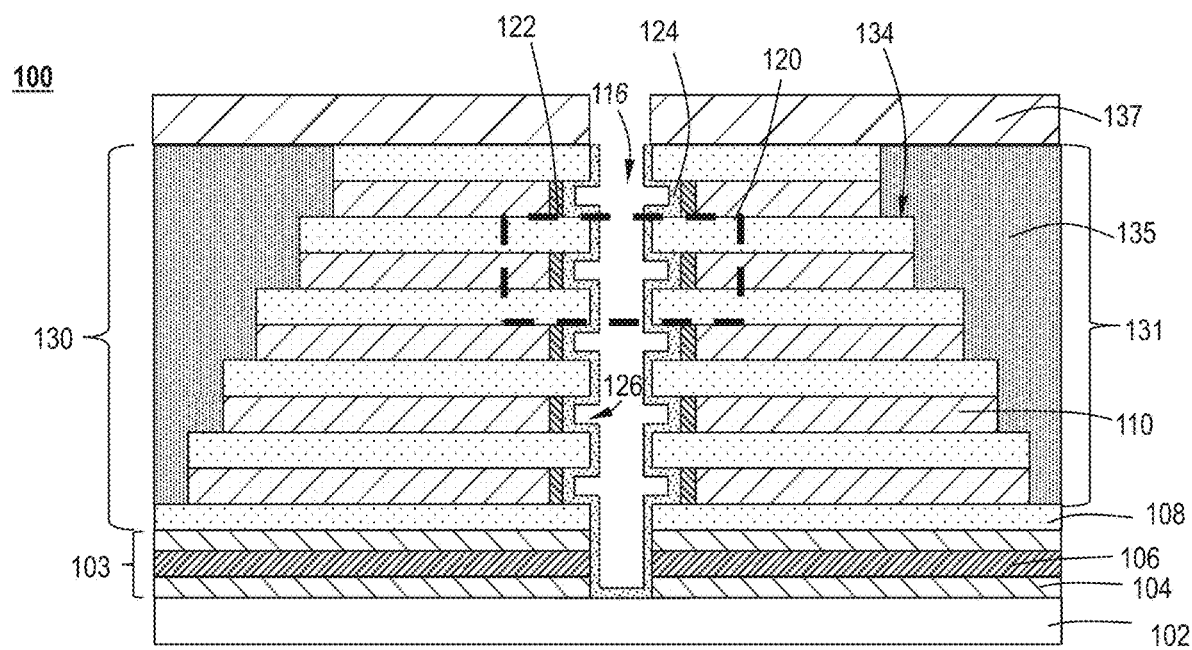
FIG. 7A illustrates a cross-sectional view of an electronic device according to one or more embodiments.
Figure 7B:
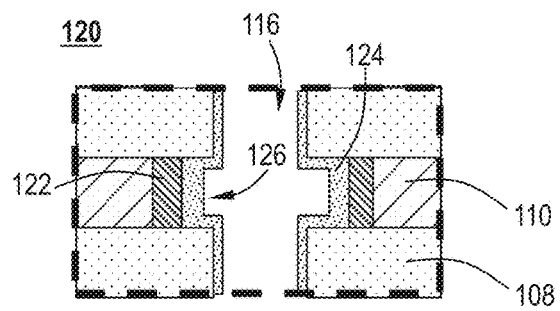
FIG. 7B an expanded view of region 120 according to one or more embodiments.

FIGS. 7A and 7B show operation 22 in which a charge trap layer 124 is formed adjacent to the blocking oxide layer 122. In some embodiments, a side surface of the charge trap layer 124 is exposed to the memory hole channel 116. The charge trap layer 124 may comprise any suitable material known to the skilled artisan. In one or more embodiments, the charge trap layer 124 comprises a nitride, e.g., silicon nitride (SiN). The charge trap layer 124 may be formed by any suitable means known to the skilled artisan. In one or more embodiments, the charge trap layer 124 is deposited by atomic layer deposition (ALD). In some embodiments, the charge trap layer 124 has a thickness in a range of from 1 nm to 15 nm or in a range of from 3 nm to 10 nm.

Figure 8A:
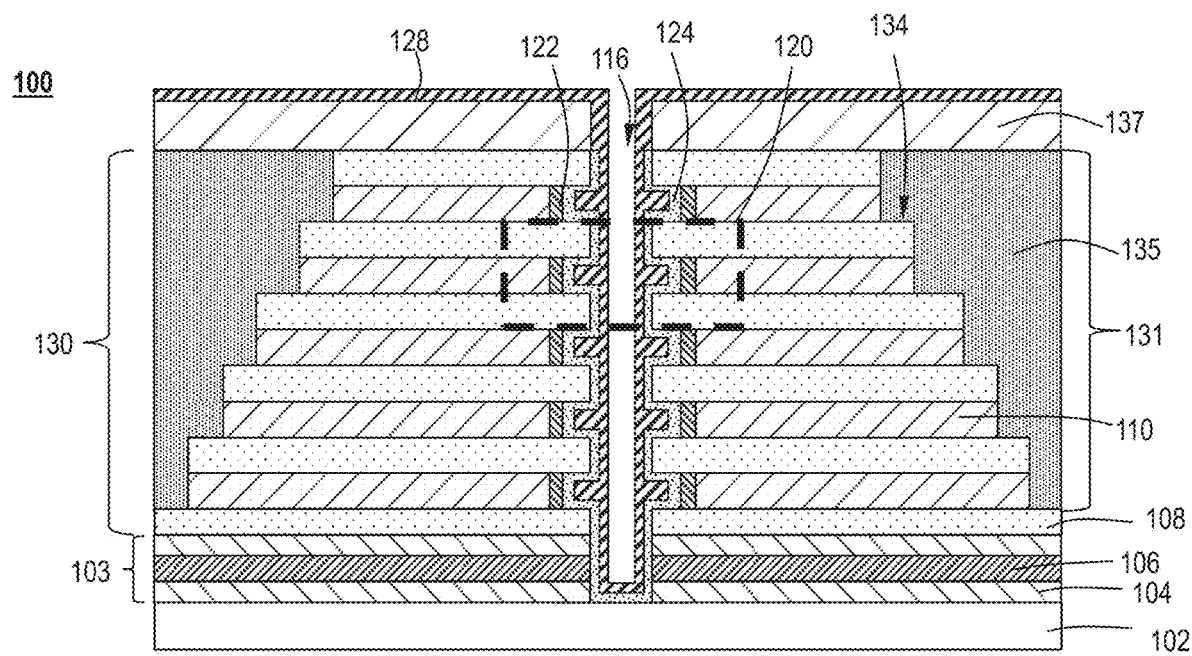
FIG. 8A illustrates a cross-sectional view of an electronic device according to one or more embodiments.
Figure 8B:
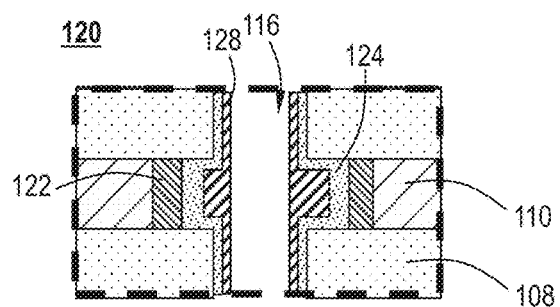
FIG. 8B an expanded view of region 120 according to one or more embodiments.

FIGS. 8A and 8B show operation 22 in which a sacrificial layer 128 is formed through the memory hole channel 116 in the recessed region 118 adjacent to the charge trap layer 124. The sacrificial layer 128 may comprise any suitable material known to the skilled artisan. In one or more embodiments, the sacrificial layer 128 comprises an oxide layer, e.g., silicon oxide ($SiO_x$). The sacrificial layer 128 may be formed by any suitable means known to the skilled artisan. In one or more embodiments, the sacrificial layer is formed by atomic layer deposition (ALD). In one or more embodiments, the sacrificial layer 128 is a conformal layer. In other embodiments, the sacrificial layer 128 is a conformal layer and the sacrificial layer 128 is substantially conformal to the underlying charge trap layer 124. As used herein, a layer which is "substantially conformal" refers to a layer where the thickness is about the same throughout (e.g., on the charge trap layer 124). A layer which is substantially conformal varies in thickness by less than or equal to about 5%, 2%, 1% or 0.5.

In one or more embodiments, as illustrated in FIG. 8B, the sacrificial layer 128 is thicker in the center of the recessed region 118 when compared to the top and bottom of the recessed region 118. In one or more embodiments, the center of the sacrificial layer 128 has a thickness in a range of from 1 nm to 50 nm or a range of from 5 to 30 nm, and the top/bottom of the sacrificial layer 128 has a thickness that is in a range of >0% to 50% of the thickness of the center of the sacrificial layer 128.

Figure 9A:
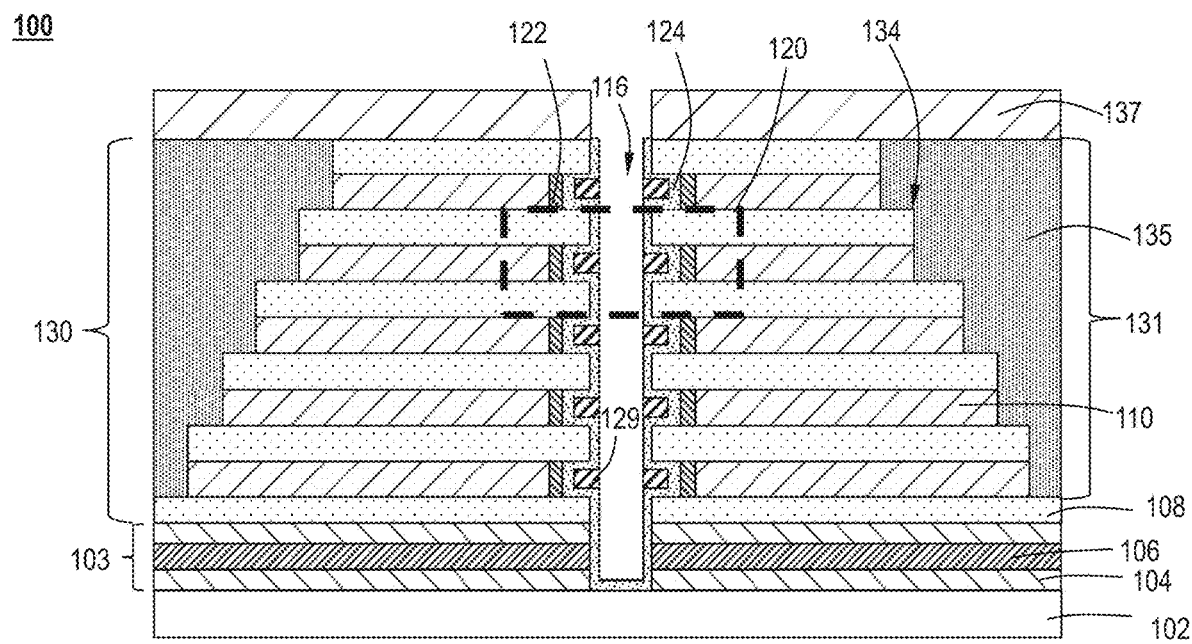
FIG. 9A illustrates a cross-sectional view of an electronic device according to one or more embodiments.
Figure 9B:
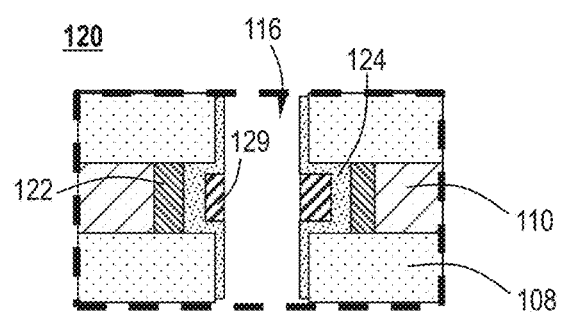
FIG. 9B illustrates an expanded view of region 120 according to one or more embodiments.

With reference to FIGS. 9A and 9B, at operation 24, a portion 129 of the sacrificial layer 128 is removed. In one or more embodiments, the portion of the sacrificial layer 128 on the sidewall of the memory hole channel 116 is removed, but the portion 129 of the sacrificial layer 128 in the recessed region 118 remains. The sacrificial layer 128 may be removed by any suitable means known to the skilled artisan. In one or more embodiments, a portion of the sacrificial layer 128 is removed by selective etching, e.g., dilute hydrofluoric acid (HF) solution or HF gas.

Figure 10A:
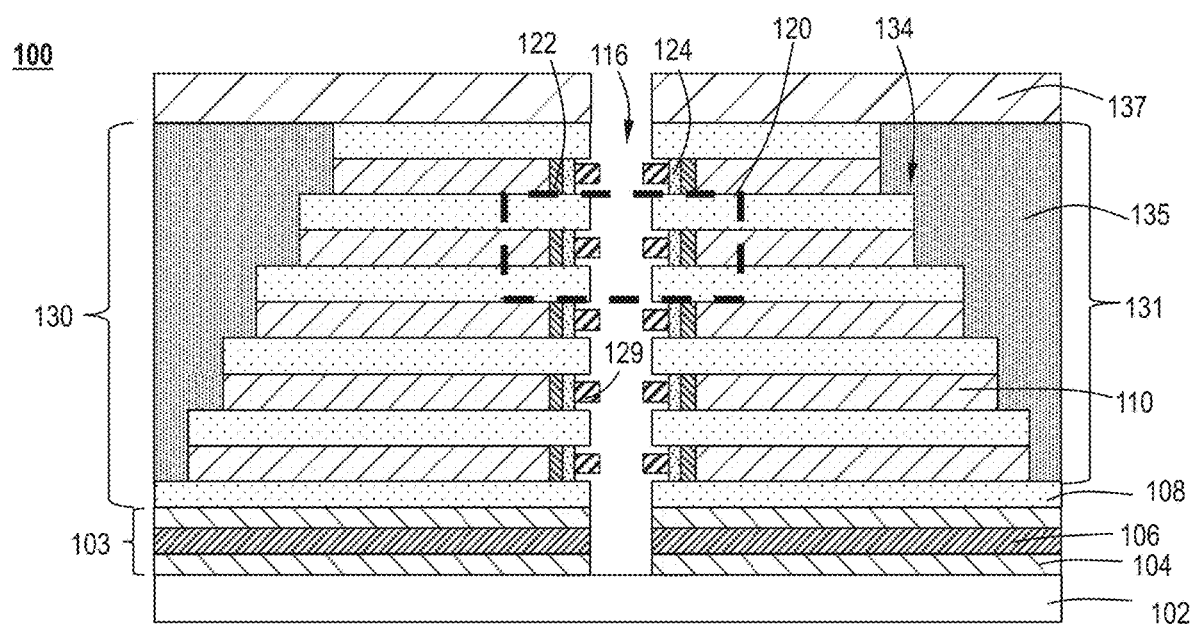
FIG. 10A illustrates a cross-sectional view of an electronic device according to one or more embodiments.
Figure 10B:
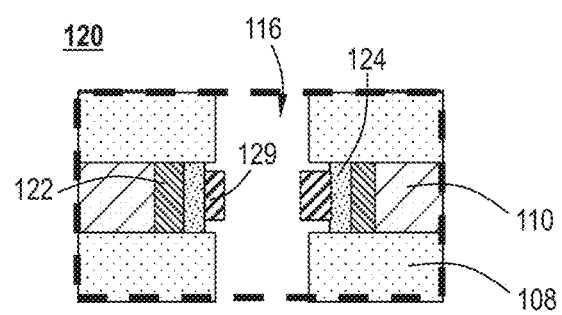
FIG. 10B illustrates an expanded view of region 120 according to one or more embodiments.

Referring to FIGS. 10A and 10B, at operation 26, the portion 129 of the sacrificial layer 128 is unmasked, e.g., trap cut, by selectively removing the charge trap layer 124 around the portion 129 of the sacrificial layer 128. The portion 129 of the sacrificial layer 128 may be unmasked by any suitable means. In one or more embodiments, the charge trap layer 124 is selectively removed from the portion 129 of the sacrificial layer 128 using a wet or dry process with phosphoric acid solution or phosphoric acid gas.

Figure 11A:
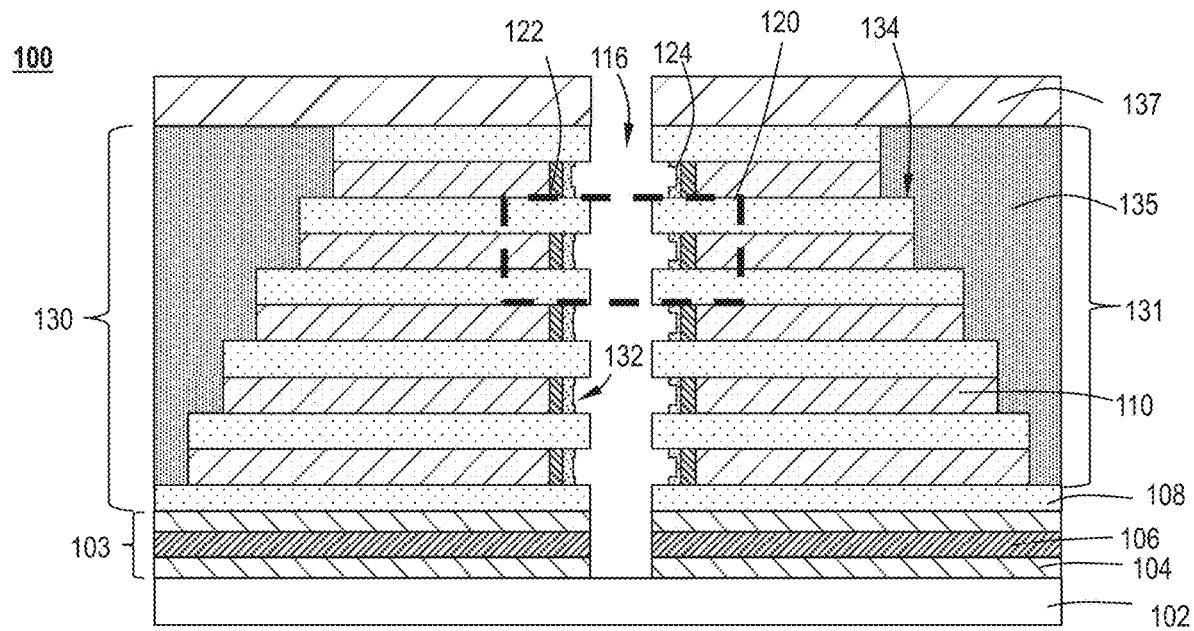
FIG. 11A illustrates a cross-sectional view of an electronic device according to one or more embodiments.
Figure 11B:
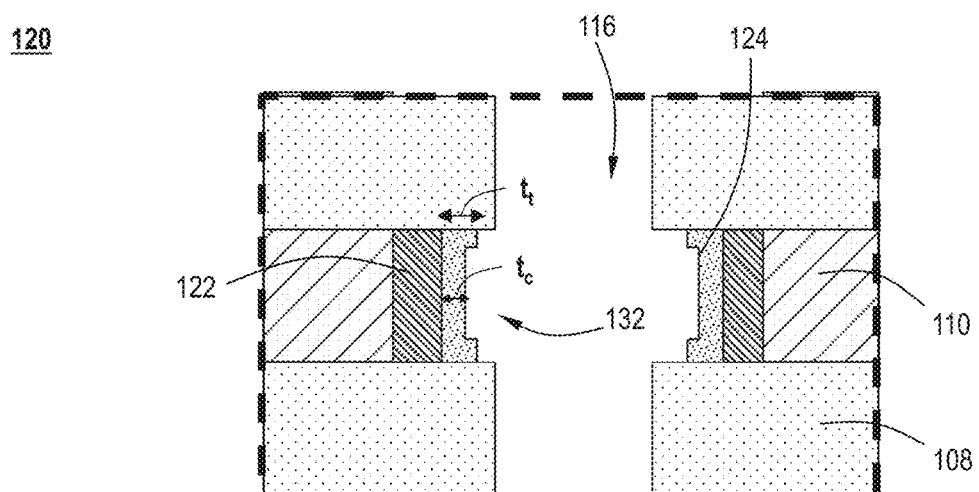
FIG. 11B an expanded view of region 120 according to one or more embodiments.
Figure 11C:
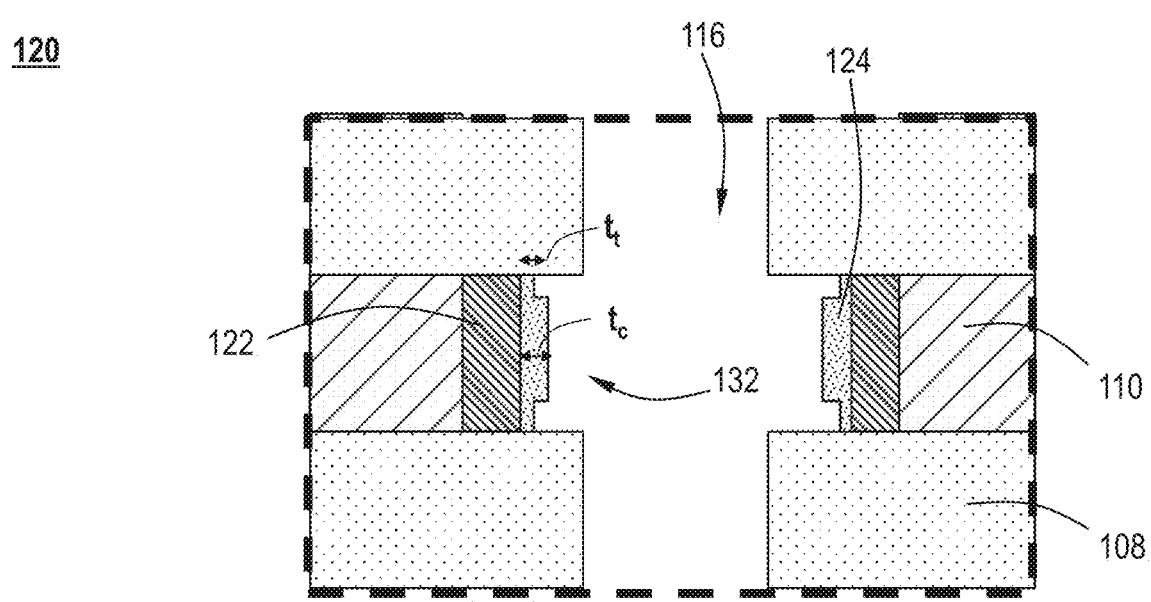
FIG. 11C an expanded view of region 120 according to one or more alternative embodiments.

With reference to FIGS. 11A and 11B, after the trap cut of operation 26, the portion 129 of the sacrificial layer 128 that remains is removed to form an opening 132. The portion 129 of the sacrificial layer 128 that remains may be removed by any suitable means. In one or more embodiments, the portion 129 of the sacrificial layer 128 that remains is removed by selective etch. In some specific embodiments, the portion 129 of the sacrificial layer 128 that remains is removed using dilute hydrofluoric (HF) acid solution or gas.

In one or more embodiments, the charge trap layer 124 has a first thickness, $t_t$, on a top portion and a second thickness, $t_c$, on a center portion. In one or more embodiments, the first thickness, $t_t$, and the second thickness, $t_c$, are different from one another. In one or more embodiments, the first thickness, $t_t$, of the top portion (and a bottom portion) of the charge trap layer 124 is greater than the second thickness, $t_c$. In one or more embodiments, the first thickness, $t_t$, is at least 1% greater than the second thickness, $t_c$. In one or more embodiments, the first thickness, $t_t$, is in a range of from 1% to 50% thicker than the second thickness, $t_c$. In other embodiments, the first thickness, $t_t$, of the top portion (and a bottom portion) of the charge trap layer 124 is less than the second thickness, $t_c$. In one or more embodiments, the first thickness, $t_t$, is at least 1% less than the second thickness, $t_c$. In one or more embodiments, the first thickness, $t_t$, is in a range of from 1% to 50% thinner than the second thickness, $t_c$.

Figure 12A:
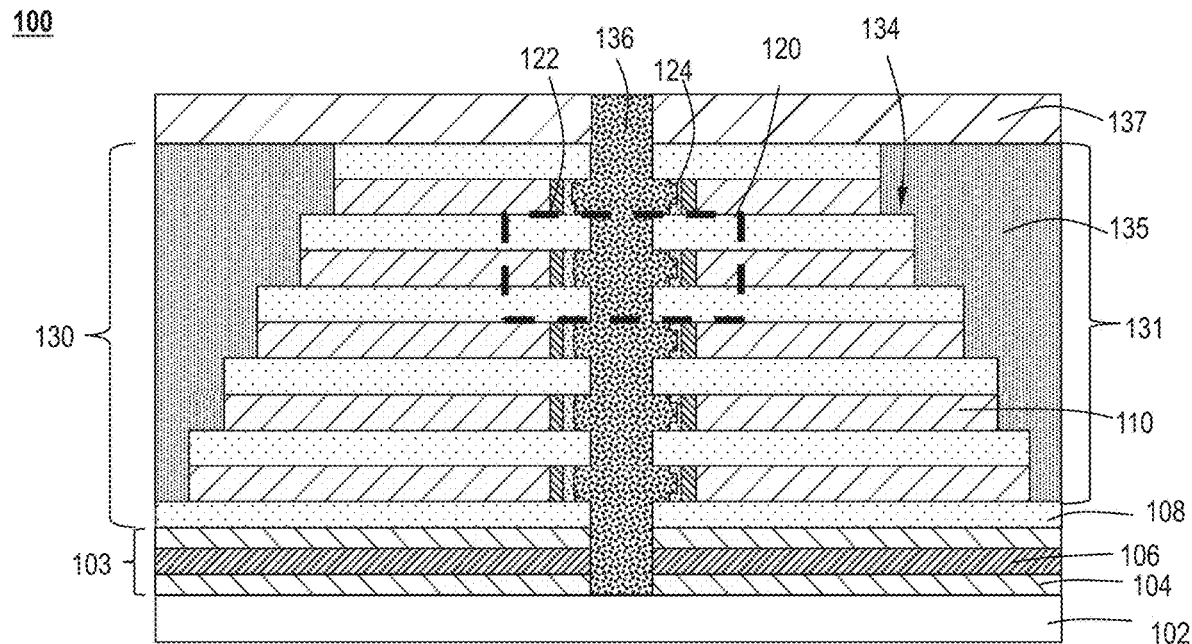
FIG. 12A illustrates a cross-sectional view of an electronic device according to one or more embodiments.
Figure 12B:
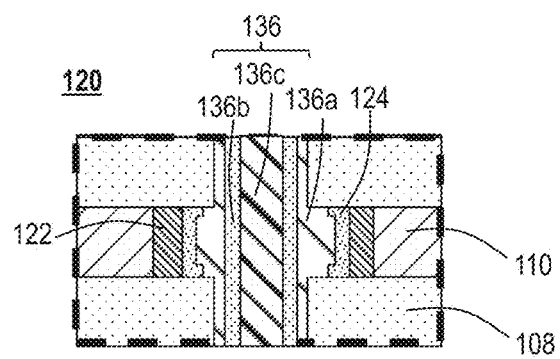
FIG. 12B an expanded view of region 120 according to one or more embodiments.

Referring to FIGS. 12A and 12B, at operation 28, the transistor layers 136 are formed in the memory hole channel 116. The transistor layers 136 can be formed by any suitable technique known to the skilled artisan. In some embodiments, the transistor layers are formed by a conformal deposition process. In some embodiments, the transistor layers are formed by one or more of atomic layer deposition or chemical vapor deposition.

In one or more embodiments, the deposition of the transistor layers 136 is substantially conformal. As used herein, a layer which is "substantially conformal" refers to a layer where the thickness is about the same throughout (e.g., on the top, middle and bottom of sidewalls and on the bottom of the memory hole channel 116). A layer which is substantially conformal varies in thickness by less than or equal to about 5%, 2%, 1% or 0.5%. The transistor layers 136 in the memory hole may comprise one or more of an aluminum oxide (AlO) layer, a blocking oxide layer, a trap layer, a tunnel oxide layer, and a channel layer.

Referring to FIG. 12B, which is an expanded view of region 120 of FIG. 12A, in one or more embodiments, the transistor layers 136 comprise a tunnel oxide layer 136a, a channel material 136b, and a core oxide material 136c in the memory hole channel 116. In one or more embodiments, the channel material 136b comprises poly-silicon.

The transistor layers 136 can have any suitable thickness depending on, for example, the dimensions of the memory hole channel 116. In some embodiments, the transistor layers 136 have a thickness in the range of from about 0.5 nm to about 50 nm, or in the range of from about 0.75 nm to about 35 nm, or in the range of from about 1 nm to about 20 nm.

Figure 13:
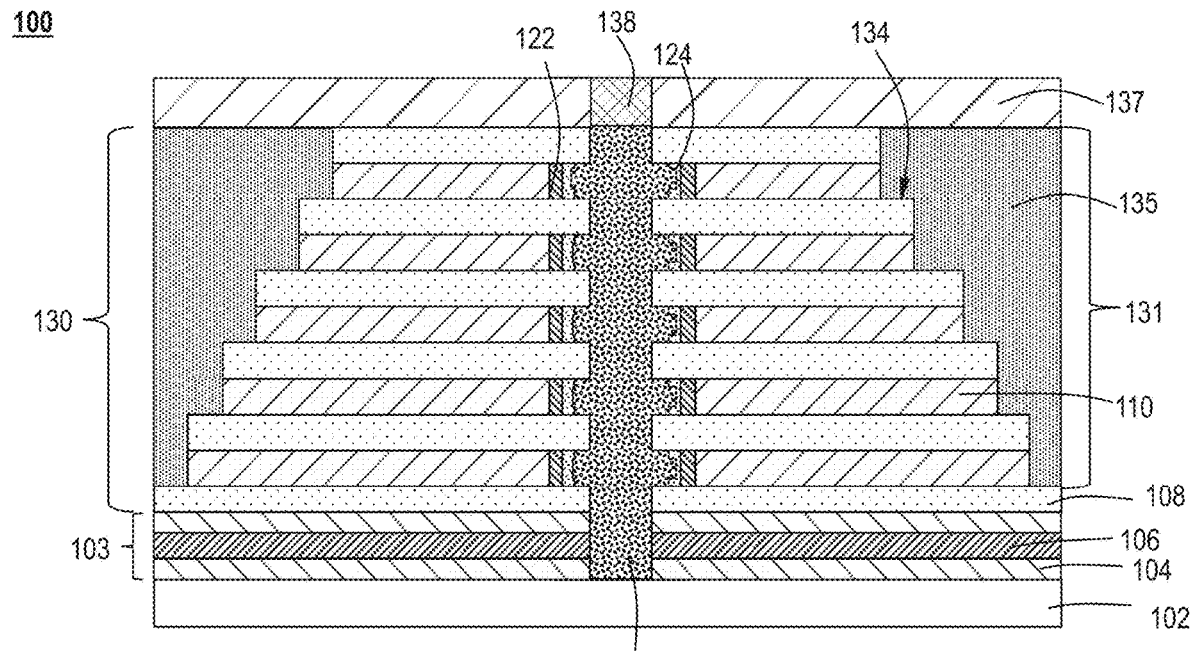
FIG. 13 illustrates a cross-sectional view of an electronic device according to one or more embodiments.

FIG. 13 shows operation 30 of method 10 where a bit line pad 138 is formed on the top surface of the transistor layers 136 and in the mask layer 137. In one or more embodiments, the core oxide 136c is recessed, and the recessed region is then filled with doped poly-silicon to form the bit line pad 138. The bit line pad 138 can be any suitable material known to the skilled artisan including, but not limited to, poly-silicon.

Figure 14:
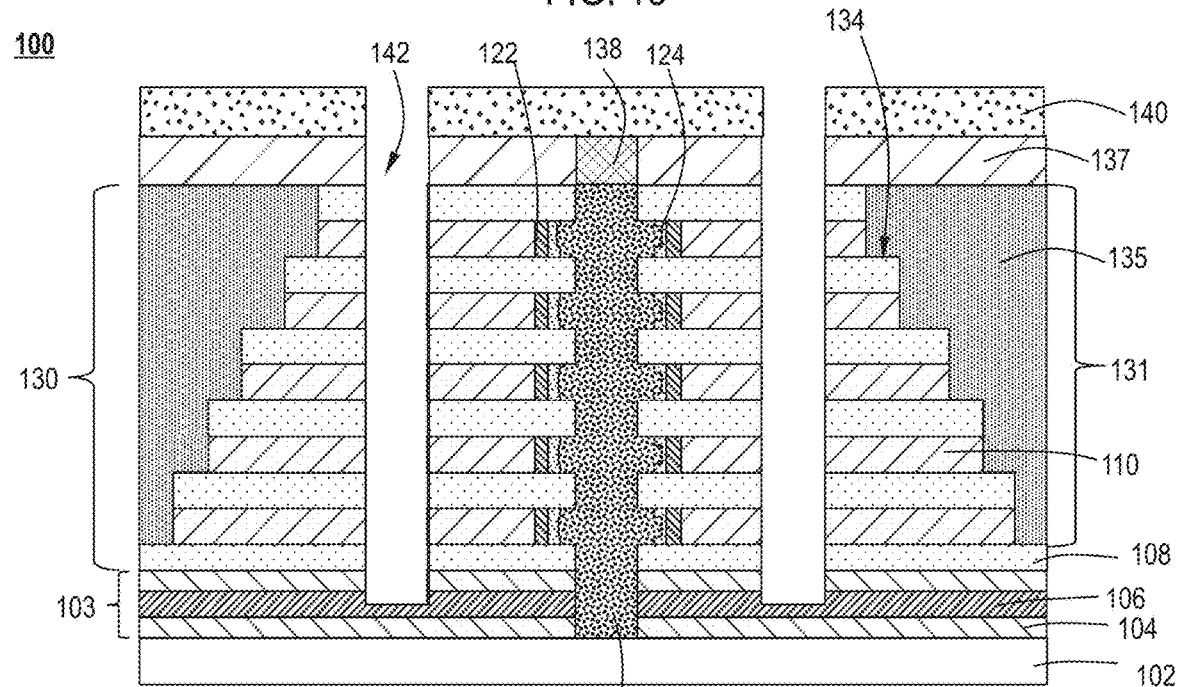
FIG. 14 illustrates a cross-sectional view of an electronic device according to one or more embodiments.

Referring to FIG. 14, at operation 32 of method 10, the memory stack 130 is slit patterned to form slit pattern openings 142 that extend from a top surface of the layer 140 to the sacrificial layer 106 of the common source line 103.

Figure 15:
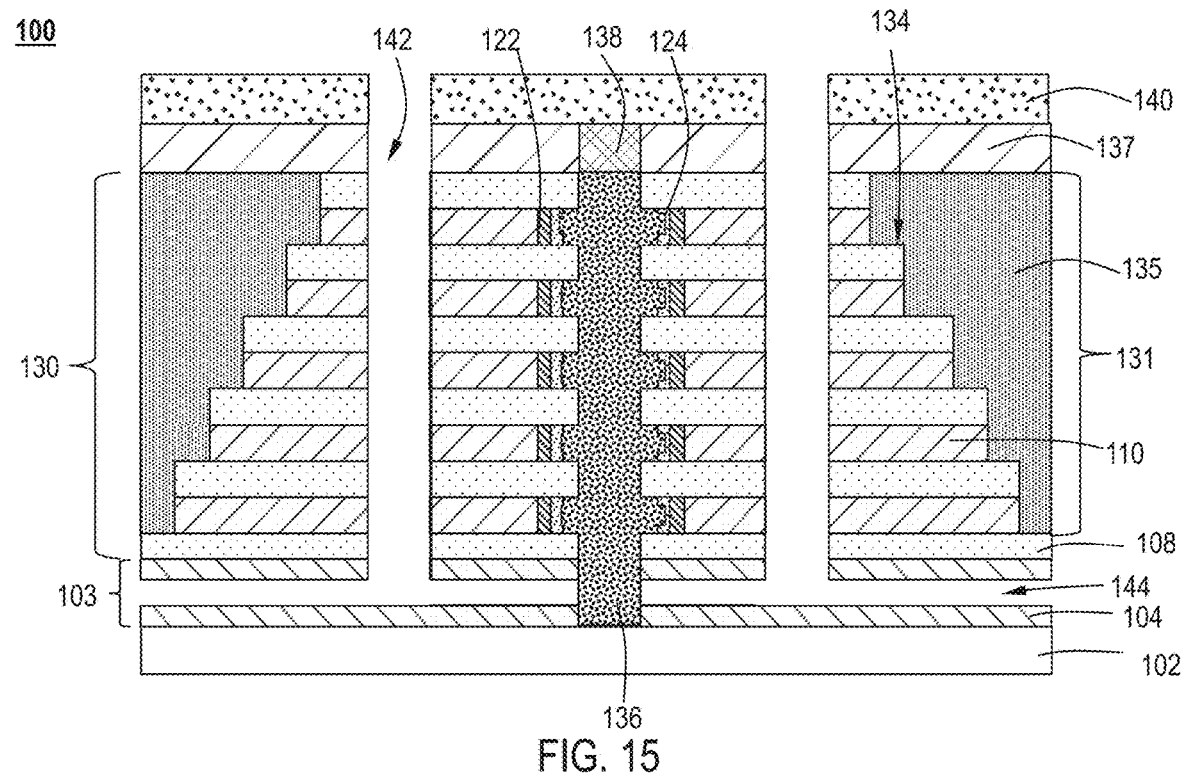
FIG. 15 illustrates a cross-sectional view of an electronic device according to one or more embodiments.
Figure 16:
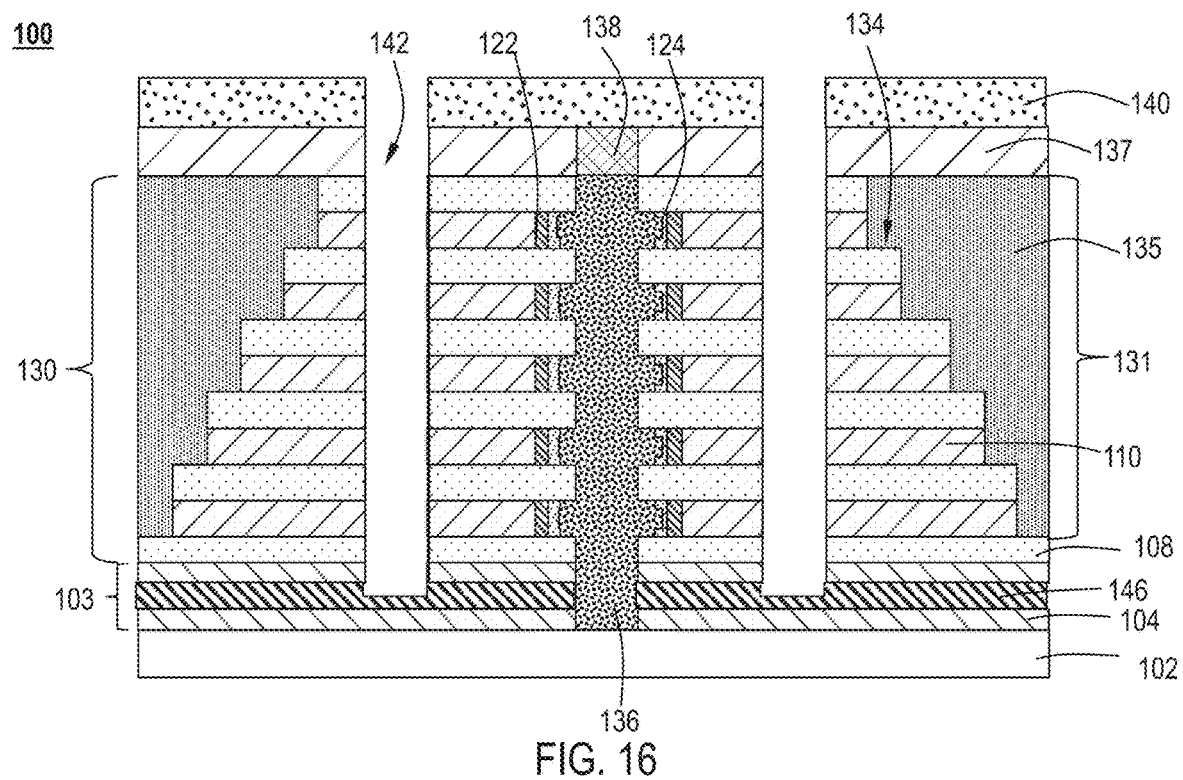
FIG. 16 illustrates a cross-sectional view of an electronic device according to one or more embodiments.

Referring to FIGS. 15 and 16, at operation 34 of method 10, the sacrificial layer 106 of the common source line 103 is removed to form opening 144 and replaced with a poly-silicon layer 146. The sacrificial layer 106 can be removed by any suitable technique known to the skilled artisan including, but not limited to, selective etching, hot phosphoric acid, and the like. The poly-silicon layer 186 may be doped or undoped.

Figure 17:
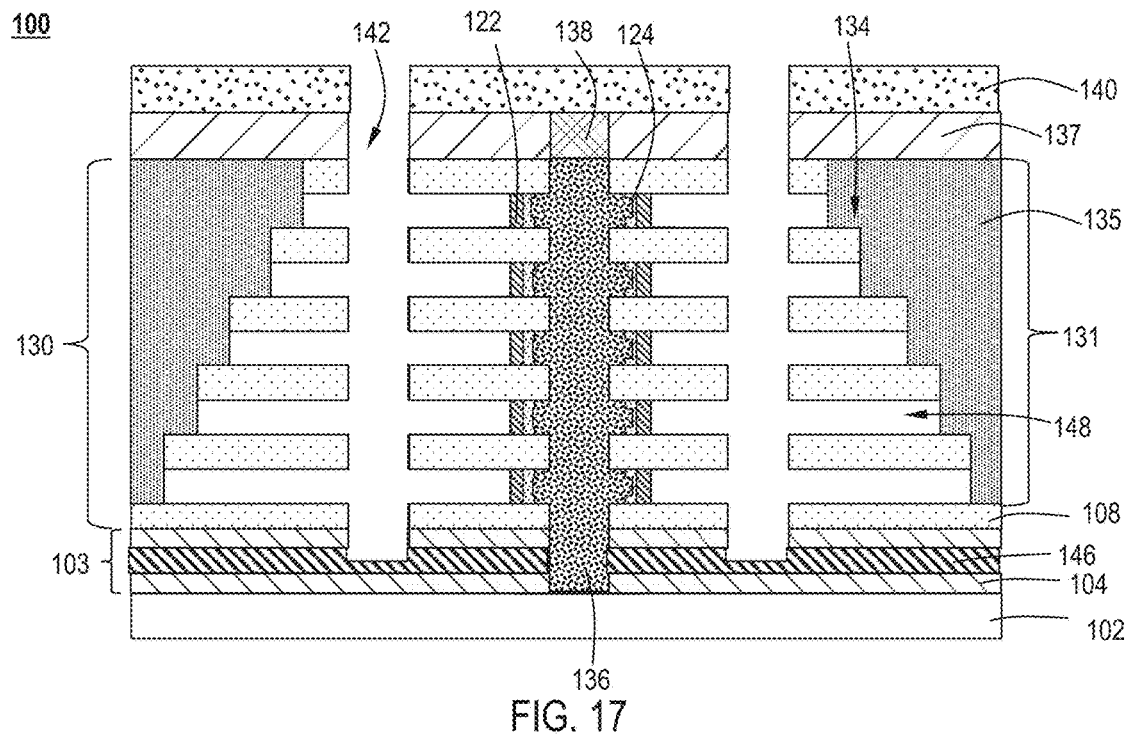
FIG. 17 illustrates a cross-sectional view of an electronic device according to one or more embodiments.

FIG. 17 illustrates operation 36, mold pullback, where the second layers 110 are removed to form opening 148. The second layers 110 may be removed by any suitable means known to the skilled artisan. In one or more embodiments, the second layers 110 are removed by selective etching, e.g., selective wet etching or selective dry etching. Removal of the second layers 110 forms opening 148.

Figure 18:
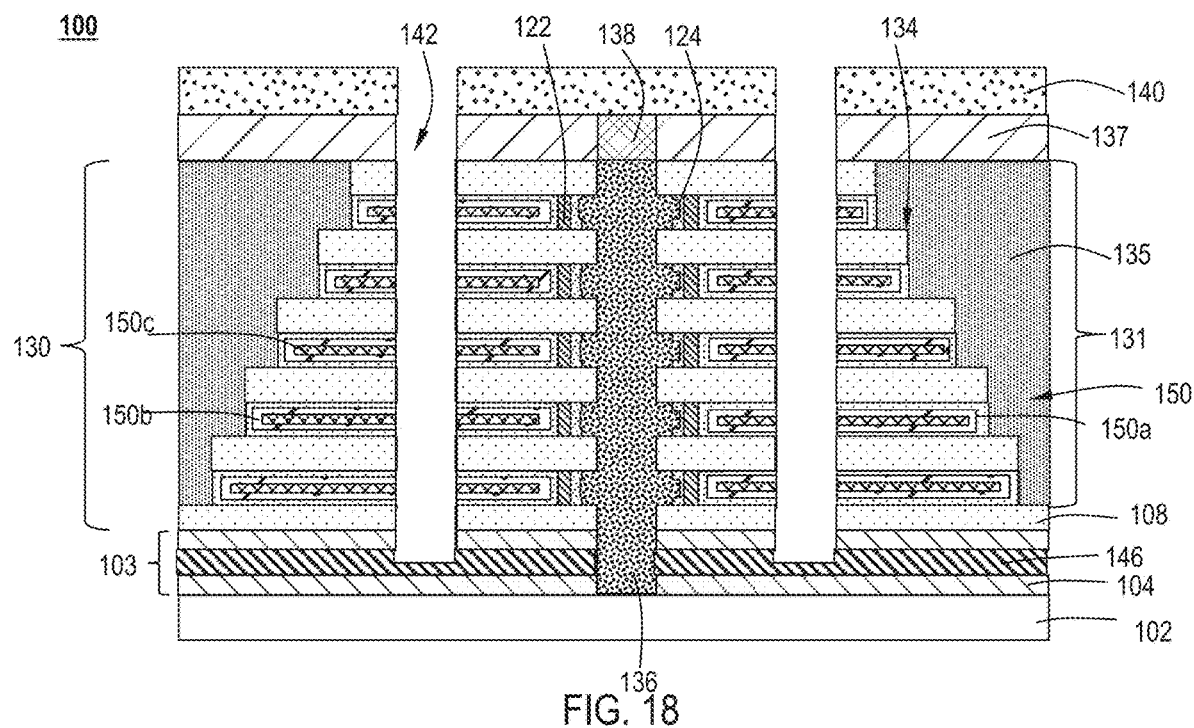
FIG. 18 illustrates a cross-sectional view of an electronic device according to one or more embodiments.

FIG. 18 shows operation 38 of method 10, where the word lines 150 are formed. The word lines 150 comprise one or more of an oxide layer 150a, a barrier layer 150b, and a word line metal 150c. The oxide layer 150a may comprise any suitable material known to the skilled artisan. In one or more embodiments, the oxide layer 150a is an aluminum oxide layer. The barrier layer 150b may comprise any suitable material known to the skilled artisan. In one or more embodiments, the barrier layer 150b comprises one or more of titanium nitride (TiN), tantalum nitride (TaN), or the like. In one or more embodiments, the word line metal 150c comprises a bulk metal comprising one or more of copper (Cu), cobalt (Co), tungsten (W), aluminum (Al), ruthenium (Ru), iridium (Ir), molybdenum (Mo), platinum (Pt), tantalum (Ta), titanium (Ti), or rhodium (Rh). In one or more embodiments, the word line metal 150c comprises tungsten (W). In other embodiments, the word line metal 150c comprises ruthenium (Ru). In one or more embodiments, the word lines 150 comprise one or more of a metal, a metal nitride, a conductive metal compound, and a semiconductor material. The metal may be selected from one or more of tungsten (W), molybdenum (Mo), tantalum (Ta), niobium (Nb), osmium (Os), zirconium (Zr), iridium (Ir), rhenium (Re), or titanium (Ti). The metal nitride may be selected from one or more of titanium nitride (TiN), tantalum nitride (TaN), tungsten nitride (WN), molybdenum nitride (MoN), and zirconium nitride (ZrN). The conductive metal compound may be selected from one or more of tungsten oxide (WOx), ruthenium oxide (RuOx), and iridium oxide (IrOx). The semiconductor material may be selected from one or more of silicon (Si), silicon germanium (SiGe), and germanium (Ge).

Figure 19:
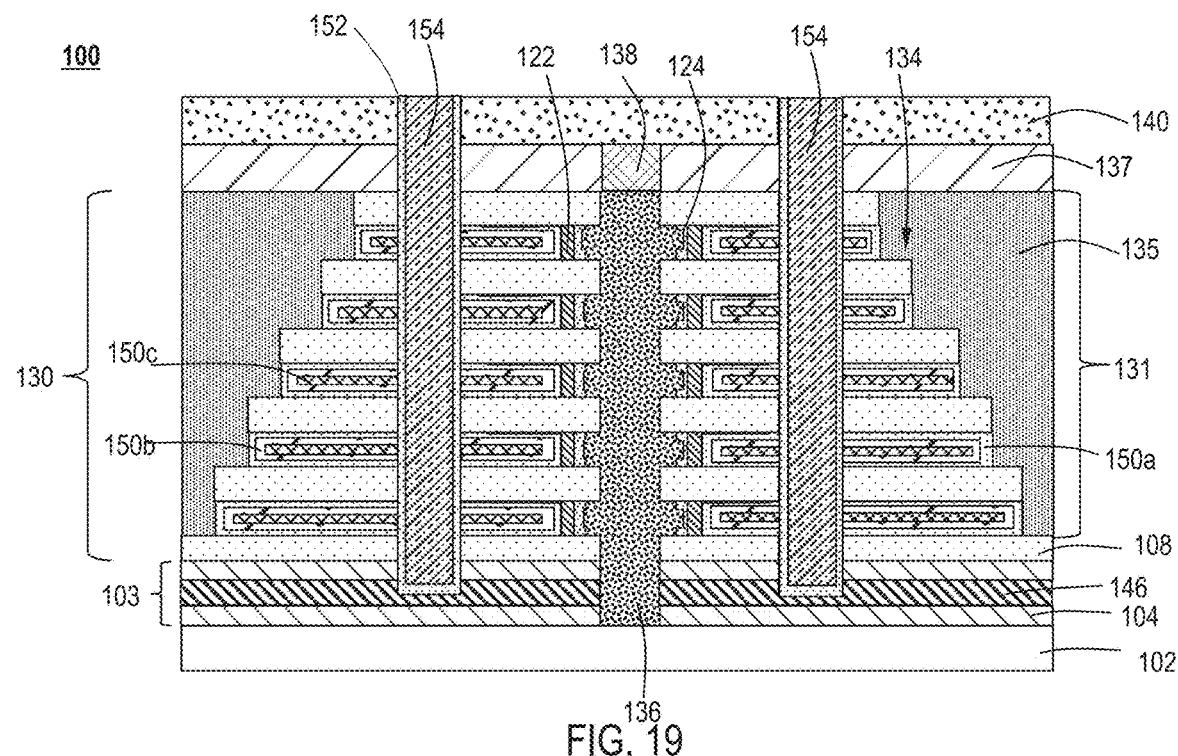
FIG. 19 illustrates a cross-sectional view of an electronic device according to one or more embodiments.

FIG. 19 shows operation 40 of method 10, where the slit 142 is filled with one or more of a spacer material 152 and a fill material 154. The spacer material 152 may comprise any suitable material known to the skilled artisan. In one or more embodiments, the spacer material 152 comprises silicon oxide (SiO$_x$). The insulator material 154 may be any suitable material known to the skilled artisan. In one or more embodiments, the fill material 154 comprises poly-silicon. The poly-silicon may be doped or undoped. In one or more embodiments, the poly-silicon is N+ doped poly-silicon.

Figure 20:
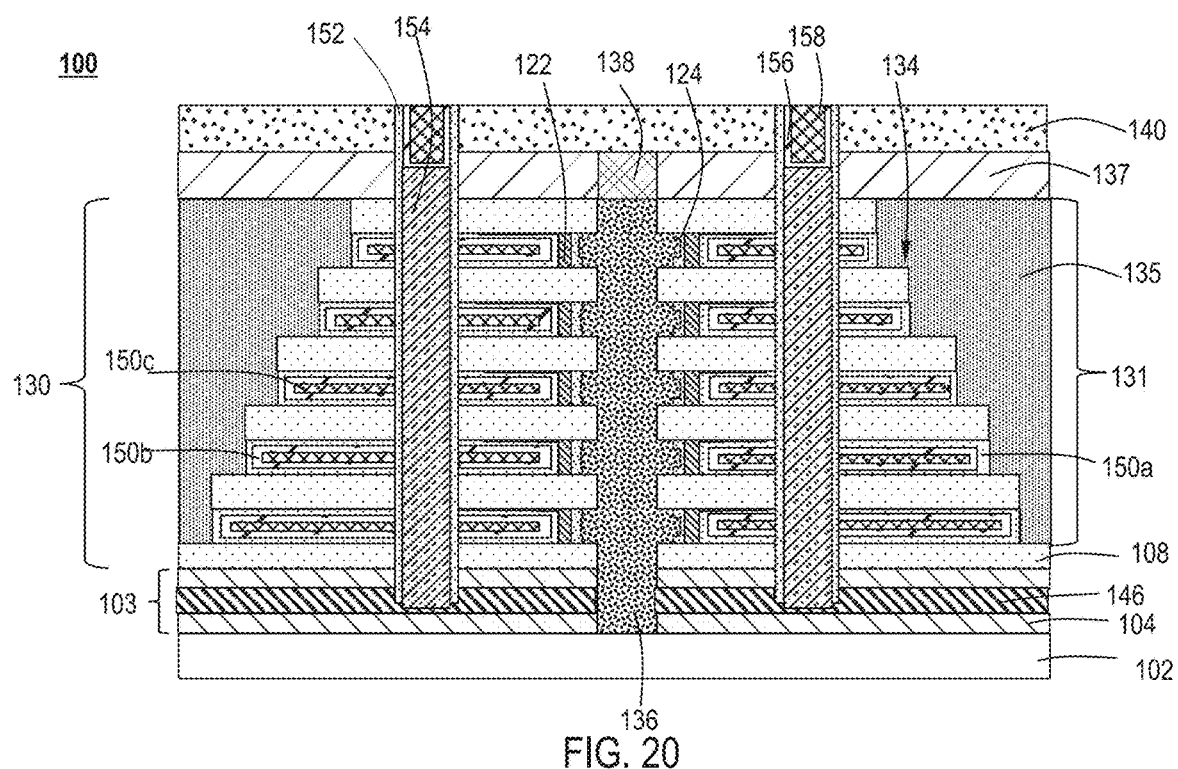
FIG. 20 illustrates a cross-sectional view of an electronic device according to one or more embodiments.

FIG. 20 shows a cap formed on the top surface of the filled slit. In one or more embodiments, the cap comprises a barrier layer 156 and a metal layer 158. The barrier layer 156 may comprise any suitable material known to the skilled artisan. In one or more embodiments, the barrier layer 156 comprises titanium nitride (TiN). The metal layer 158 may comprises any suitable metal known to the skilled artisan. In some embodiments, the metal 158 comprises tungsten (W).

Figure 21A:
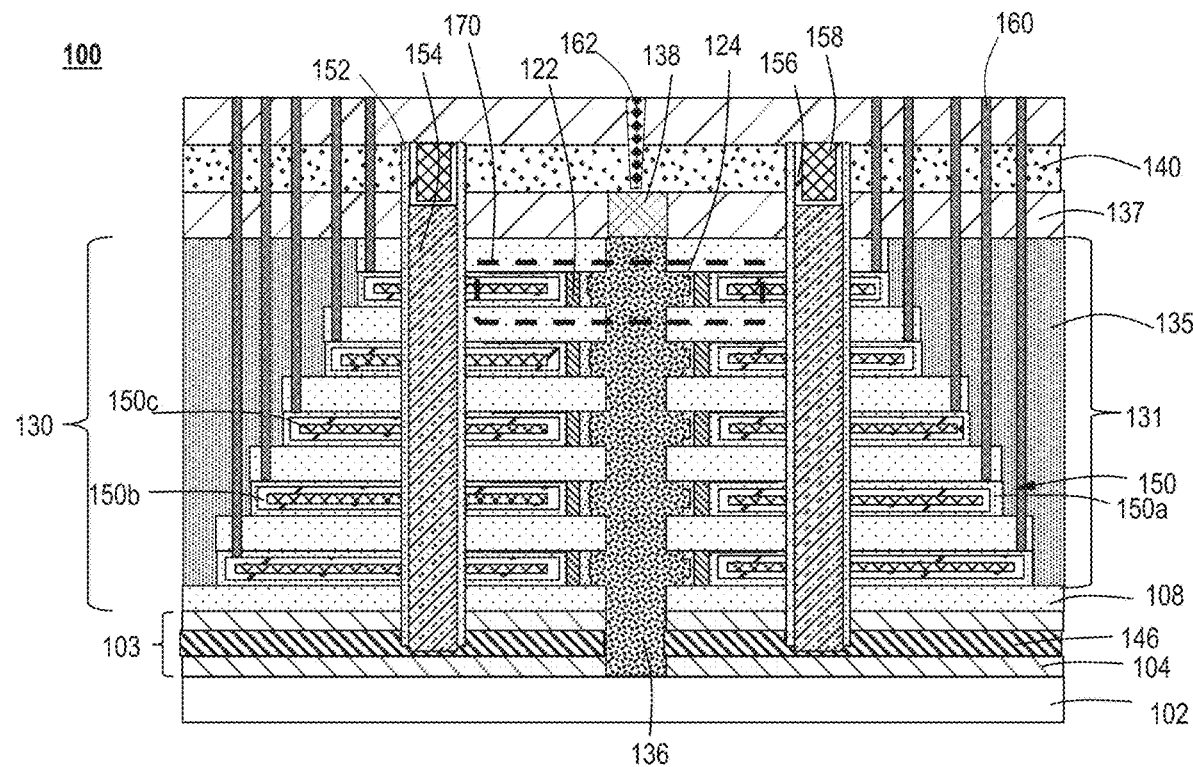
FIG. 21A illustrates a cross-sectional view of an electronic device according to one or more embodiments.
Figure 21B:
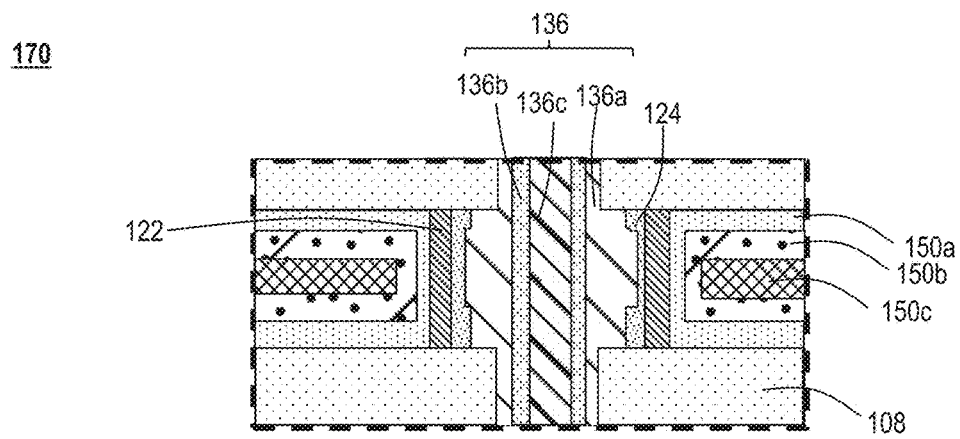
FIG. 21B an expanded view of region 170 according to one or more embodiments.

FIGS. 21A and 21B illustrates operations 42 and 44, where bit line pad studs 162 and the word line (W/L) contacts 160 are formed. The bit line studs 162 may be formed by any suitable means known to the skilled artisan.

The word line contacts 160 extend through the memory stack 130 a distance sufficient to terminate at one of the word lines 150. In one or more embodiments, the word line contacts 160 can comprise any suitable material known to the skilled artisan. In one or more embodiments, the word line contacts 160 comprises one or more of a metal, a metal silicide, poly-silicon, amorphous silicon, or EPI silicon. In one or more embodiments, the word line contact 160 is doped by either N type dopants or P type dopants in order to reduce contact resistance. In one or more embodiments, the metal of the word line contacts 160 are selected from one or more of copper (Cu), cobalt (Co), tungsten (W), titanium (Ti), molybdenum (Mo), nickel (Ni), ruthenium (Ru), silver (Ag), gold (Au), iridium (Ir), tantalum (Ta), or platinum (Pt).

Figure 22:
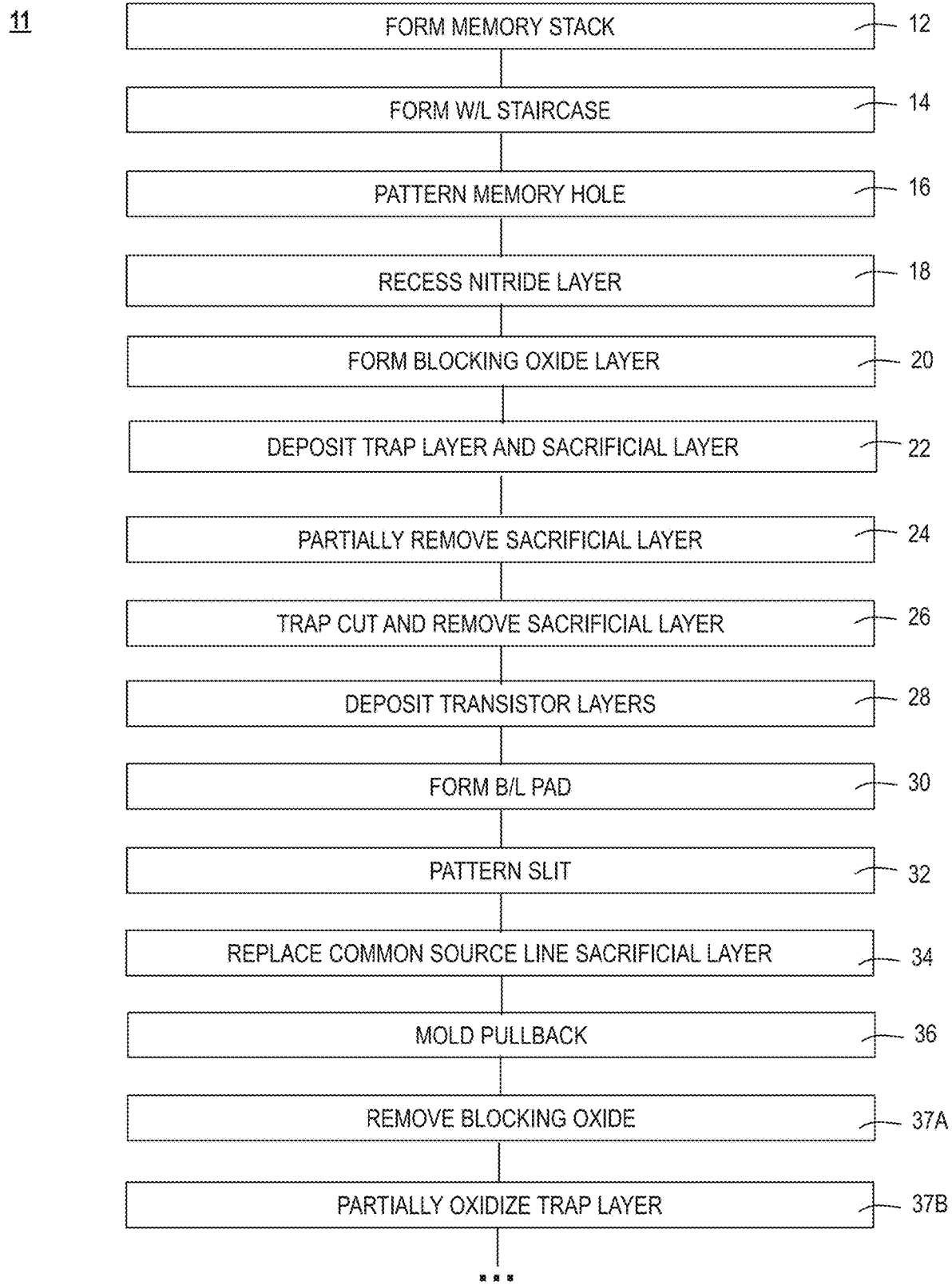
FIG. 22 illustrates a process flow diagram of a method of forming a memory device according to embodiments described herein.
Figure 22:
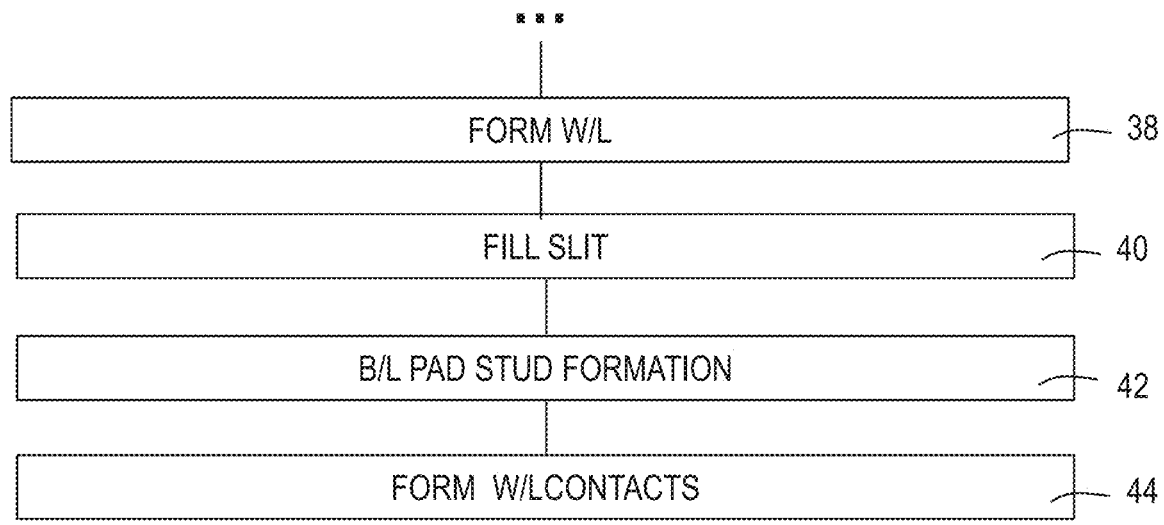

FIG. 22 illustrates a flowchart for an exemplary alternative method 11 for forming a memory device. The skilled artisan will recognize that the method 11 can include any or all of the processes illustrated. Additionally, the order of the individual processes can be varied for some portions. The method 11 can start at any of the enumerated processes without deviating from the disclosure. With reference to FIG. 22, at operation 12, a memory stack is formed. At operation 14, a word line staircase is formed in the memory stack. At operation 16, a memory hole is patterned. At operation 18, the nitride layer is recessed. At operation 20, a blocking oxide is formed in the recess. At operation 22, a charge trap layer is deposited, followed by deposition of a sacrificial layer. At operation 24, the sacrificial layer is partially removed. At operation 26, the charge trap layer is unmasked, and the sacrificial layer is removed. At operation 28, transistor layers are deposited in the memory hole. At operation 30, the bit line pad is formed. At operation 32, the device is slit patterned. At operation 34, the sacrificial layer of the common source line is removed and replaced. At operation 36, the nitride layer of the memory stack is removed (mold pullback). At operation 37A, the blocking oxide is removed. At operation 37B, a portion of the charge trap layer is oxidized. The method 11 then continues on in the same fashion as method 10 of FIG. 1. At operation, 38, the word line is formed. At operation 40, the slit is filled with a dielectric material. At operation 42, the bit line pad studs are formed. At operation 44, back-end-of-the-line (BEOL) contacts are formed.

FIGS. 23A to 26B illustrate an alternative method 11. With references to FIG. 22, the operations 12 through 36 are identical to the operations of method 10 described above.

Figure 23A:
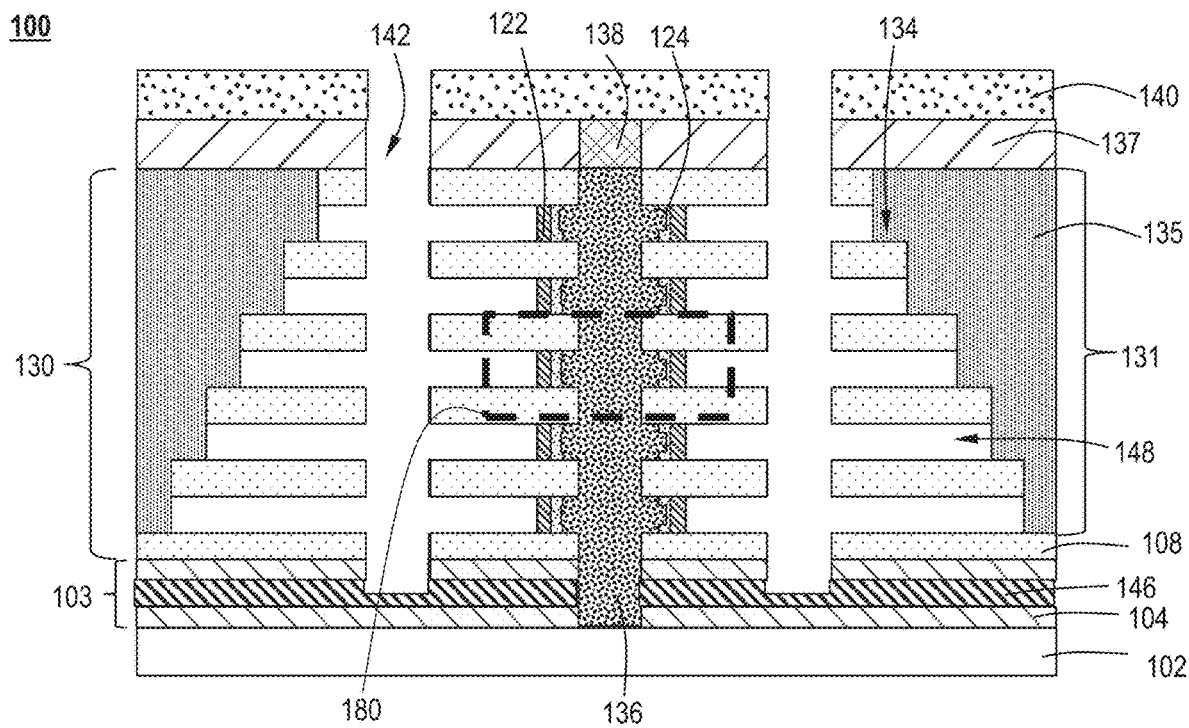
FIG. 23A illustrates a perspective view of an electronic device according to one or more embodiments.
Figure 23B:
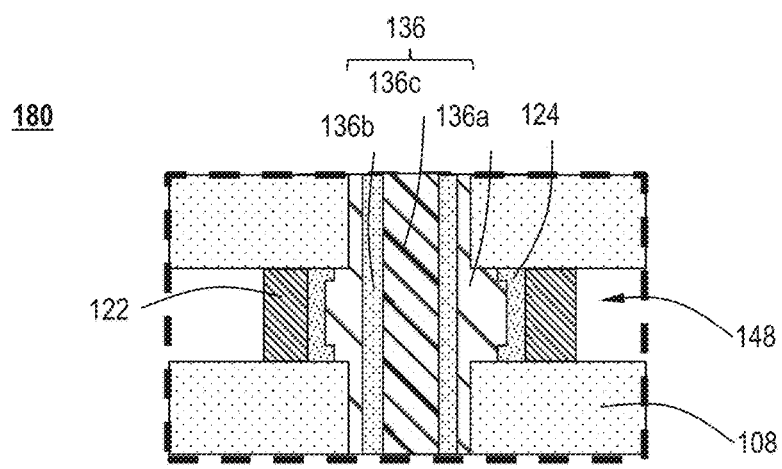
FIG. 23B an expanded view of region 180 according to one or more embodiments.

FIGS. 23A and 23B illustrate the device 100 after operation 36, mold pullback, where the second layers 110 are removed to form opening 148. The second layers 110 may be removed by any suitable means known to the skilled artisan. In one or more embodiments, the second layers 110 are removed by selective etching, e.g., selective wet etching or selective dry etching. Removal of the second layers 110 forms opening 148.

Figure 24A:
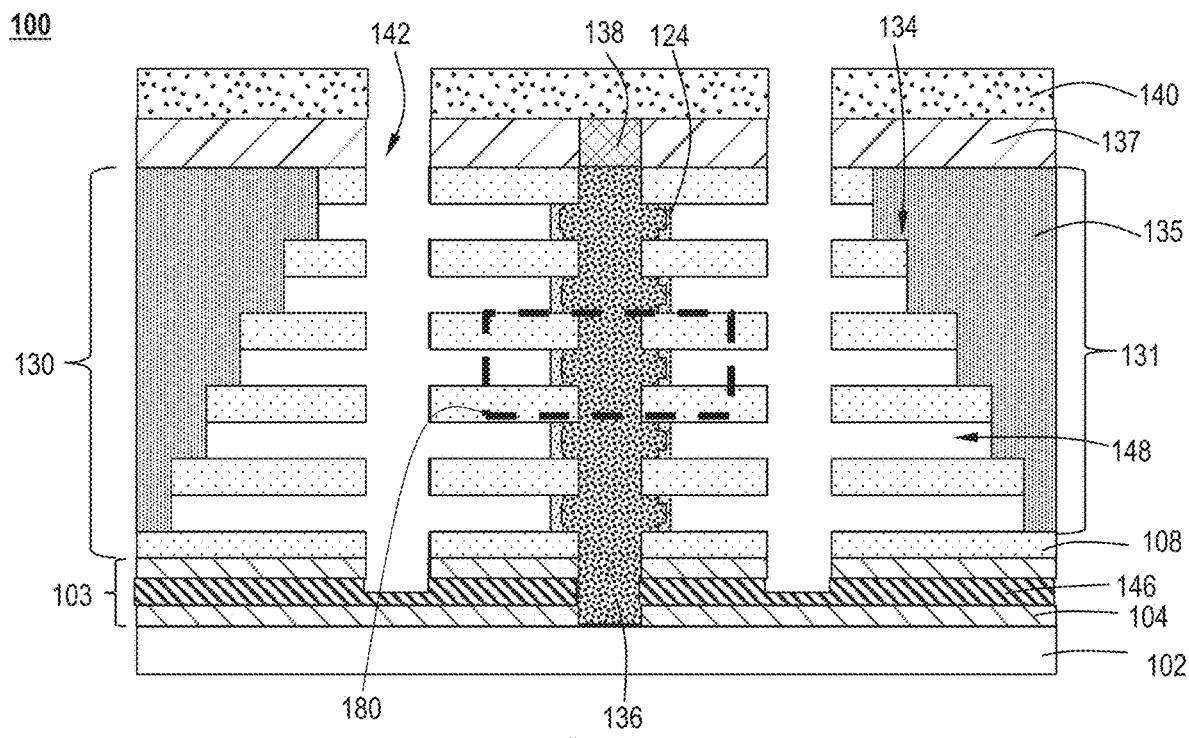
FIG. 24A illustrates a perspective view of an electronic device according to one or more embodiments.
Figure 24B:
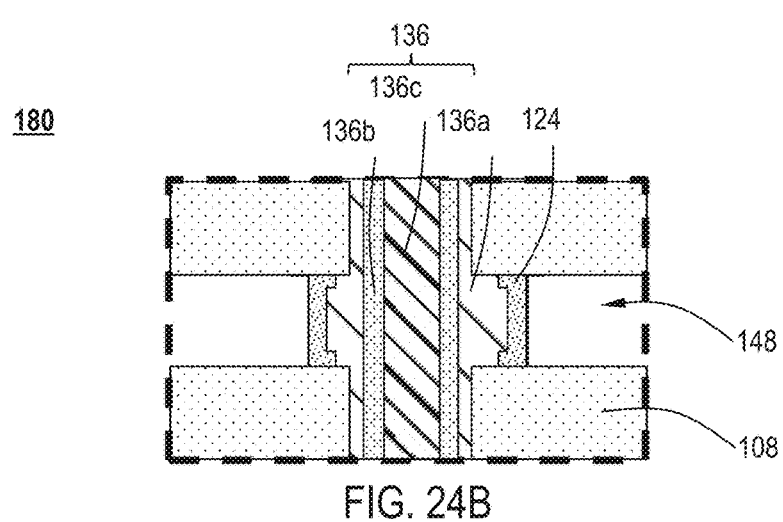
FIG. 24B an expanded view of region 180 according to one or more embodiments.

Referring to FIGS. 24A and 24B, at operation 37A, the blocking oxide 122 is removed through the opening 148. The blocking oxide 122 may be removed by any suitable means known to the skilled artisan.

Figure 25A:
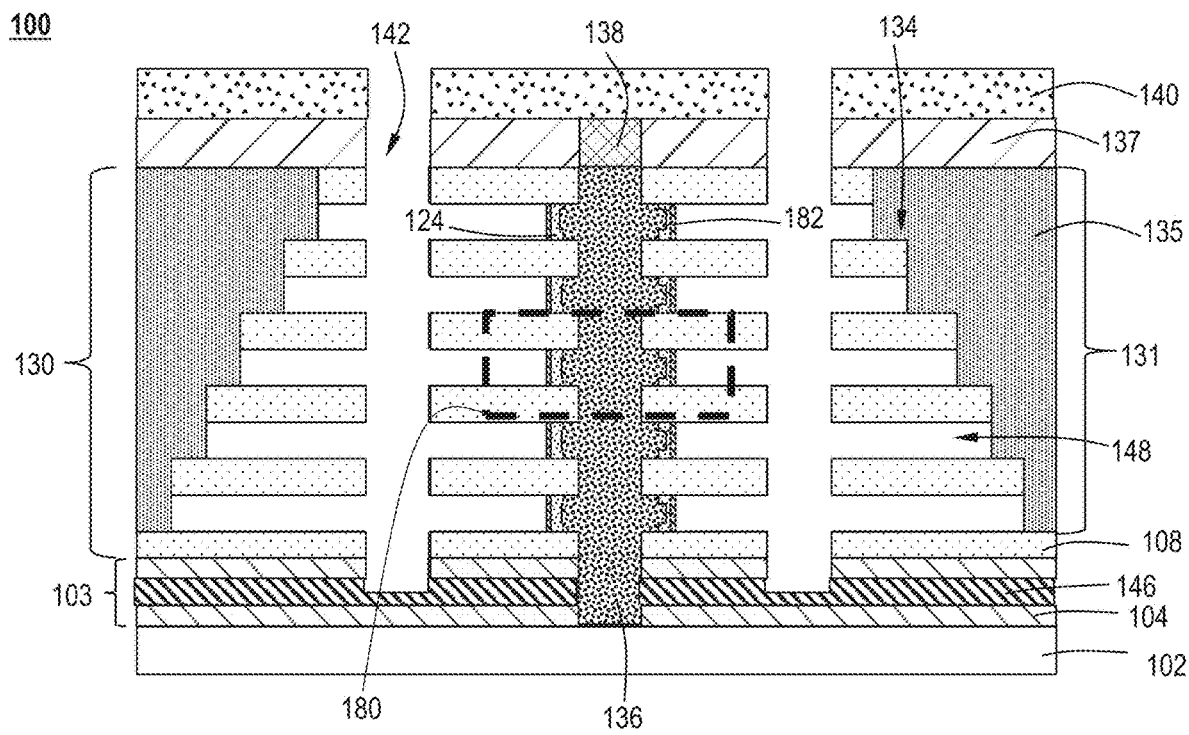
FIG. 25A illustrates a perspective view of an electronic device according to one or more embodiments.
Figure 25B:
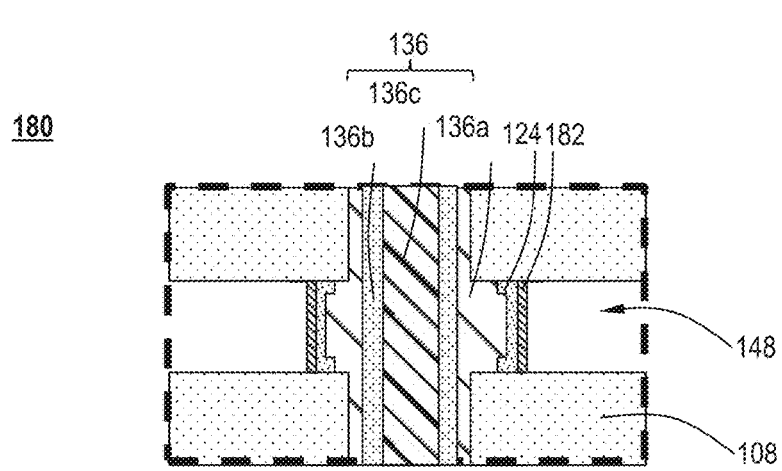
FIG. 25B an expanded view of region 180 according to one or more embodiments.

FIGS. 25A and 25B illustrate operation 37B of method 11, where a portion of the charge trap layer 124 is oxidized to form an oxide layer 182. The charge trap layer 124 may be partially oxidized by any means known to the skilled artisan. In one or more embodiments, the oxide layer 182 comprises one or more of silicon oxynitride (SiON) or silicon oxide (SiO$_x$).

Figure 26A:
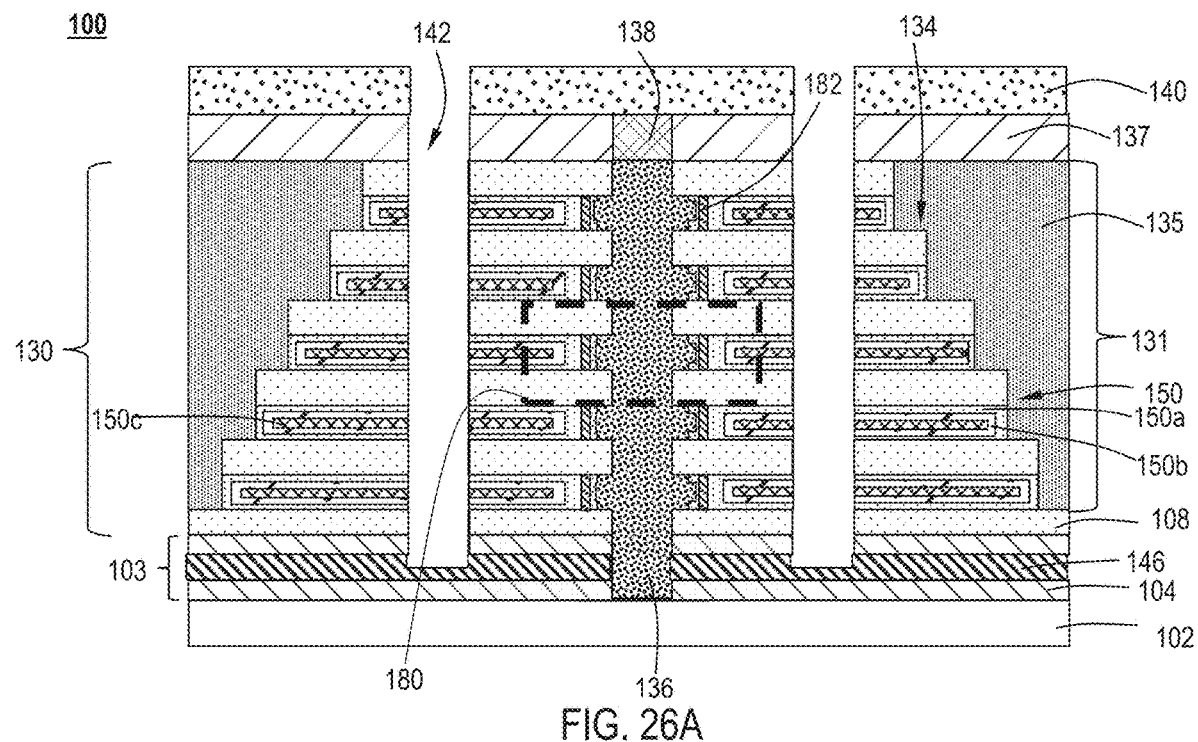
FIG. 26A illustrates a perspective view of an electronic device according to one or more embodiments.
Figure 26B:
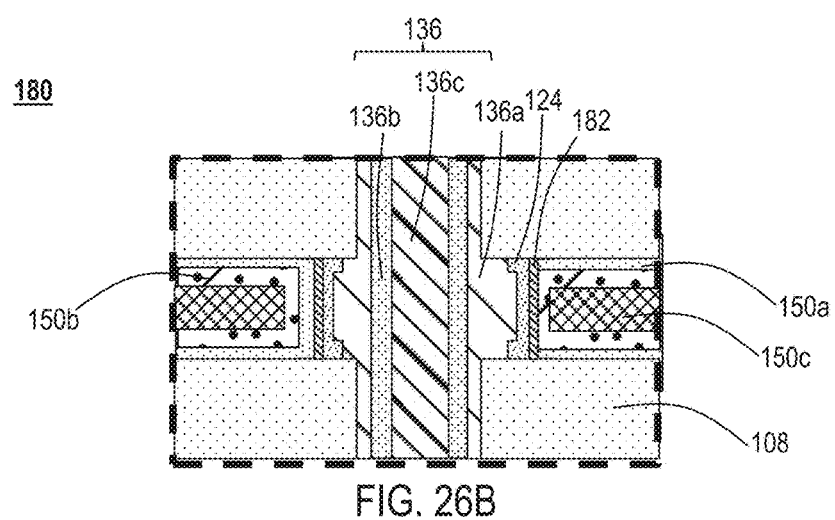
FIG. 26B an expanded view of region 180 according to one or more embodiments.

FIGS. 26A and 26B illustrate operation 38 of method 11, where the word lines 150 are formed. The word lines 150 comprise one or more of an oxide layer 150a, a barrier layer 150b, and a word line metal 150c. The oxide layer 150a may comprise any suitable material known to the skilled artisan. In one or more embodiments, the oxide layer 150a is an aluminum oxide layer. The barrier layer 150b may comprise any suitable material known to the skilled artisan. In one or more embodiments, the barrier layer 150b comprises one or more of titanium nitride (TiN), tantalum nitride (TaN), or the like. In one or more embodiments, the word line metal 150c comprises a bulk metal comprising one or more of copper (Cu), cobalt (Co), tungsten (W), aluminum (Al), ruthenium (Ru), iridium (Ir), molybdenum (Mo), platinum (Pt), tantalum (Ta), titanium (Ti), or rhodium (Rh). In one or more embodiments, the word line metal 150c comprises tungsten (W). In other embodiments, the word line metal 150c comprises ruthenium (Ru). In one or more embodiments, the word lines 150 comprise one or more of a metal, a metal nitride, a conductive metal compound, and a semiconductor material. The metal may be selected from one or more of tungsten (W), molybdenum (Mo), tantalum (Ta), niobium (Nb), osmium (Os), zirconium (Zr), iridium (Ir), rhenium (Re), or titanium (Ti). The metal nitride may be selected from one or more of titanium nitride (TiN), tantalum nitride (TaN), tungsten nitride (WN), molybdenum nitride (MoN), and zirconium nitride (ZrN). The conductive metal compound may be selected from one or more of tungsten oxide (WOx), ruthenium oxide (RuOx), and iridium oxide (IrOx). The semiconductor material may be selected from one or more of silicon (Si), silicon germanium (SiGe), and germanium (Ge).

The method 11 then proceeds on in the same fashion as described above with respect to method 10 of FIG. 1 and FIGS. 19 to 21B. At operation 40, the slit 142 is filled. At operation 42, the bit line pad studs are formed. At operation 44, back-end-of-the-line (BEOL) contacts are formed.

In other embodiments, a method of forming a semiconductor device is provided. The method may comprise forming a memory hole in a memory stack comprising alternating layers of a first material and a second material on a substrate. The second material is recessed through the memory hole to form a recessed region. A portion of the second material adjacent the memory hole is oxidized to form a blocking oxide layer. A charge trap layer is deposited on the blocking oxide layer. A sacrificial layer is conformally deposited on the charge trap layer. The charge trap layer is selectively removed from the sacrificial layer, and then the sacrificial layer is removed. A bit line is formed in the memory hole. The memory device is then slit patterned, and a plurality of word lines are formed. The slit is then filled.

Figure 27:
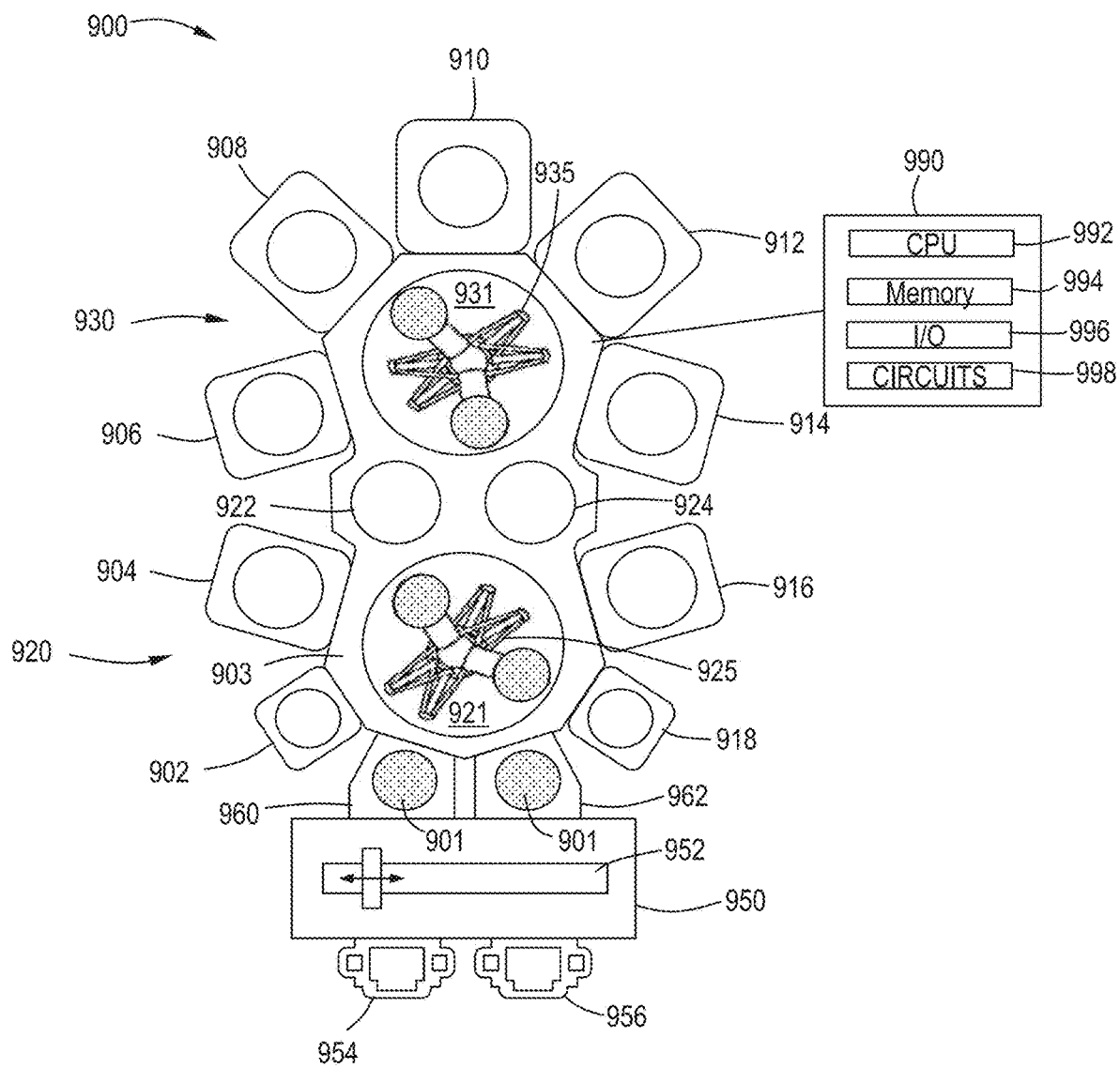
FIG. 27 illustrates a cluster tool according to one or more embodiments.

Additional embodiments of the disclosure are directed to processing tools 900 for the formation of the memory devices and methods described, as shown in FIG. 27.

The cluster tool 900 includes at least one central transfer station 921, 931 with a plurality of sides. A robot 925, 935 is positioned within the central transfer station 921, 931 and is configured to move a robot blade and a wafer to each of the plurality of sides.

The cluster tool 900 comprises a plurality of processing chambers 902, 904, 906, 908, 910, 912, 914, 916, and 918, also referred to as process stations, connected to the central transfer station. The various processing chambers provide separate processing regions isolated from adjacent process stations. The processing chamber can be any suitable chamber including, but not limited to, a preclean chamber, a buffer chamber, transfer space(s), a wafer orienter/degas chamber, a cryo cooling chamber, a deposition chamber, annealing chamber, etching chamber, a selective oxidation chamber, an oxide layer thinning chamber, or a word line deposition chamber. The particular arrangement of process chambers and components can be varied depending on the cluster tool and should not be taken as limiting the scope of the disclosure.

In some embodiments, the cluster tool 900 includes a selection-gate-for-drain (SGD) patterning chamber. The selection-gate-for-drain (SGD) patterning chamber of some embodiments comprises one or more selective etching chamber.

In the embodiment shown in FIG. 27, a factory interface 950 is connected to a front of the cluster tool 900. The factory interface 950 includes a loading chamber 954 and an unloading chamber 956 on a front 951 of the factory interface 950. While the loading chamber 954 is shown on the left and the unloading chamber 956 is shown on the right, those skilled in the art will understand that this is merely representative of one possible configuration.

The size and shape of the loading chamber 954 and unloading chamber 956 can vary depending on, for example, the substrates being processed in the cluster tool 900. In the embodiment shown, the loading chamber 954 and unloading chamber 956 are sized to hold a wafer cassette with a plurality of wafers positioned within the cassette.

A robot 952 is within the factory interface 950 and can move between the loading chamber 954 and the unloading chamber 956. The robot 952 is capable of transferring a wafer from a cassette in the loading chamber 954 through the factory interface 950 to load lock chamber 960. The robot 952 is also capable of transferring a wafer from the load lock chamber 962 through the factory interface 950 to a cassette in the unloading chamber 956. As will be understood by those skilled in the art, the factory interface 950 can have more than one robot 952. For example, the factory interface 950 may have a first robot that transfers wafers between the loading chamber 954 and load lock chamber 960, and a second robot that transfers wafers between the load lock 962 and the unloading chamber 956.

The cluster tool 900 shown has a first section 920 and a second section 930. The first section 920 is connected to the factory interface 950 through load lock chambers 960, 962. The first section 920 includes a first transfer chamber 921 with at least one robot 925 positioned therein. The robot 925 is also referred to as a robotic wafer transport mechanism. The first transfer chamber 921 is centrally located with respect to the load lock chambers 960, 962, process chambers 902, 904, 916, 918, and buffer chambers 922, 924. The robot 925 of some embodiments is a multi-arm robot capable of independently moving more than one wafer at a time. In some embodiments, the first transfer chamber 921 comprises more than one robotic wafer transfer mechanism. The robot 925 in first transfer chamber 921 is configured to move wafers between the chambers around the first transfer chamber 921. Individual wafers are carried upon a wafer transport blade that is located at a distal end of the first robotic mechanism.

After processing a wafer in the first section 920, the wafer can be passed to the second section 930 through a pass-through chamber. For example, chambers 922, 924 can be uni-directional or bi-directional pass-through chambers. The pass-through chambers 922, 924 can be used, for example, to cryo cool the wafer before processing in the second section 930 or allow water cooling or post-processing before moving back to the first section 920.

A system controller 990 is in communication with the first robot 925, second robot 935, first plurality of processing chambers 902, 904, 916, 918 and second plurality of processing chambers 906, 908, 910, 912, 914. The system controller 990 can be any suitable component that can control the processing chambers and robots. For example, the system controller 990 can be a computer including a central processing unit, memory, suitable circuits, and storage.

Processes may generally be stored in the memory of the system controller 990 as a software routine that, when executed by the processor, causes the process chamber to perform processes of the present disclosure. The software routine may also be stored and/or executed by a second processor (not shown) that is remotely located from the hardware being controlled by the processor. Some or all of the method of the present disclosure may also be performed in hardware. As such, the process may be implemented in software and executed using a computer system, in hardware as, e.g., an application specific integrated circuit or other type of hardware implementation, or as a combination of software and hardware. The software routine, when executed by the processor, transforms the general-purpose computer into a specific purpose computer (controller) that controls the chamber operation such that the processes are performed.

In one or more embodiments, a processing tool comprises: a central transfer station comprising a robot configured to move a wafer; a plurality of process stations, each process station connected to the central transfer station and providing a processing region separated from processing regions of adjacent process stations, the plurality of process stations comprising a selection-gate-for-drain (SGD) patterning chamber; and a controller connected to the central transfer station and the plurality of process stations, the controller configured to activate the robot to move the wafer between process stations, and to control a process occurring in each of the process stations.

One or more embodiments provide a non-transitory computer readable medium including instructions, that, when executed by a controller of a processing chamber, causes the processing chamber to perform the operations of: form a memory hole in a memory stack comprising alternating layers of a first material and a second material on a substrate; recess the second material through the memory hole to form a first recessed region; oxidize a portion of the second material adjacent the memory hole to form a blocking oxide layer; deposit a charge trap layer on the blocking oxide layer; conformally deposit a sacrificial layer on the charge trap layer; selectively remove the charge trap layer from the sacrificial layer; remove the sacrificial layer; form a bit line in the memory hole; pattern a slit; form a plurality of word lines; and fill the slit.

The use of the terms "a" and "an" and "the" and similar referents in the context of describing the materials and methods discussed herein (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the materials and methods, and does not pose a limitation on the scope unless otherwise claimed. No language in the specification should be construed as indicating any non-claimed element as essential to the practice of the disclosed materials and methods.

Reference throughout this specification to "one embodiment," "certain embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in one embodiment" or "in an embodiment" in various places throughout this specification are not necessarily referring to the same embodiment of the disclosure. Furthermore, the particular features, structures, materials, or characteristics may be combined in any suitable manner in one or more embodiments.

Although the disclosure herein has been described with reference to particular embodiments, it is to be understood that these embodiments are merely illustrative of the principles and applications of the present disclosure. It will be apparent to those skilled in the art that various modifications and variations can be made to the method and apparatus of the present disclosure without departing from the spirit and scope of the disclosure. Thus, it is intended that the present disclosure include modifications and variations that are within the scope of the appended claims and their equivalents.

What is claimed is:

1. A semiconductor memory device comprising:
   a plurality of memory cells formed around a memory hole extending through a memory stack on a substrate, the memory stack comprising a plurality of word lines and corresponding plurality of dielectric material layers alternatingly arranged to form the memory stack, each of the plurality of memory cells comprising a blocking oxide layer, a charge trap layer, and a tunnel oxide layer,
   wherein the blocking oxide layer and the charge trap layer are confined by the dielectric materials layers in each of the plurality of memory cells, wherein the tunnel oxide layer extends continuously in the memory hole, and wherein the charge trap layer is confined between the tunnel oxide layer and the word line in each of the plurality of memory cells and has a first thickness on a top portion and a second thickness on a center portion, the first thickness different than the second thickness, and has a vertical height that is identical to a distance between the dielectric material layers; and
   a filled slit extending through the memory stack adjacent to the memory hole.

2. The semiconductor memory device of claim 1, wherein the first thickness is at least 1% greater than the second thickness.

3. The semiconductor memory device of claim 1, wherein the first thickness is at least 1% less than the second thickness.

4. The semiconductor memory device of claim 1, wherein the charge trap layer comprises silicon nitride (SiN).

5. The semiconductor memory device of claim 1, further comprising a bit line pad on a top surface of the memory hole.

6. The semiconductor memory device of claim 1, wherein the word lines comprise one or more of a metal, a metal nitride, a conductive metal compound, and a semiconductor material.

7. The semiconductor memory device of claim 6, wherein the metal is selected from one or more of tungsten (W), molybdenum (Mo), tantalum (Ta), niobium (Nb), osmium (Os), zirconium (Zr), iridium (Ir), rhenium (Re), and titanium (Ti), wherein the metal nitride is selected from one or more of titanium nitride (TiN), tantalum nitride (TaN), tungsten nitride (WN), molybdenum nitride (MoN), and zirconium nitride (ZrN), wherein the conductive metal compound is selected from one or more of tungsten oxide (WOx), ruthenium oxide (RuOx), and iridium oxide (IrOx), and wherein the semiconductor material is selected from one or more of silicon (Si), silicon germanium (SiGe), and germanium (Ge).

8. The semiconductor memory device of claim 1, wherein the filled slit comprises one or more of a spacer material and a fill material.

9. The semiconductor memory device of claim 1, wherein the substrate is a common source line, the common source line comprising a sacrificial layer, an oxide layer, and a poly-silicon layer.

10. The semiconductor memory device of claim 1, wherein the semiconductor memory device is a 3D-NAND.

* * * * *